(12) United States Patent
Ostadzadeh et al.

(10) Patent No.: US 11,042,648 B2
(45) Date of Patent: Jun. 22, 2021

(54) QUANTIFICATION OF PRIVACY RISK IN LOCATION TRAJECTORIES

(71) Applicant: HERE Global B.V., Eindhoven (NL)

(72) Inventors: Arash Ostadzadeh, Nuenen (NL); Raghavendran Balu, Eindhoven (NL)

(73) Assignee: HERE Global B.V., Eindhoven (NL)

( * ) Notice: Subject to any disclaimer, the term of this patent is extended or adjusted under 35 U.S.C. 154(b) by 46 days.

(21) Appl. No.: 16/514,409

(22) Filed: Jul. 17, 2019

(65) Prior Publication Data
US 2021/0019425 A1  Jan. 21, 2021

(51) Int. Cl.
*G06F 21/60* (2013.01)

(52) U.S. Cl.
CPC ...... *G06F 21/60* (2013.01); *G06F 2221/2111* (2013.01)

(58) Field of Classification Search
CPC ............ G06F 21/60; G06F 2221/2111; H04W 12/02
See application file for complete search history.

(56) References Cited

U.S. PATENT DOCUMENTS

| 9,547,845 | B2 | 1/2017 | Agrawal | |
| 2013/0165063 | A1* | 6/2013 | Kitsunezuka | H03D 7/163 455/188.1 |
| 2013/0269038 | A1* | 10/2013 | Takahashi | H04L 9/32 726/26 |
| 2014/0379628 | A1* | 12/2014 | Agrawal | H04L 63/04 706/48 |
| 2017/0016993 | A1* | 1/2017 | Liu | G01S 19/14 |
| 2018/0046825 | A1* | 2/2018 | Kou | G06F 16/9027 |

(Continued)

FOREIGN PATENT DOCUMENTS

CN  106295395 A  1/2017

OTHER PUBLICATIONS

Kaplan, Emre, et al. "Privacy Risks in Trajectory Data Publishing: Reconstructing Private Trajectories from continuous Properties." International Conference on Knowledge-Based and Intelligent Information and Engineering Systems. KES 2008. Lecture Notes in Computer Science, vol. 5178. Springer, Berlin, Heidelberg. Sep. 2008. (pp. 1-9).

(Continued)

*Primary Examiner* — Meng Li
(74) *Attorney, Agent, or Firm* — Lempia Summerfield Katz LLC

(57) ABSTRACT

An apparatus for the quantification of privacy risk in geographic data for probe devices in a geographic region includes a database, a sub-trajectory module, a candidate list calculator, and a provision module. The database is configured to store trajectory data based on sequences of sensor measurements. The sub-trajectory module is configured to receive trajectory data points based on sequences of sensor measurements of the probe devices collected in the geographic region and determine sub-trajectories from changes in trajectory identifiers. The candidate list calculator is configured to concatenate at least two of the sub-trajectories based on at least one concatenation parameter. The provision module is configured to calculate a reconstruction rate in the trajectory data and provide the reconstruction rate for a quantification of privacy risk to an external device.

18 Claims, 12 Drawing Sheets

(56) References Cited

U.S. PATENT DOCUMENTS

2018/0188053 A1* 7/2018 Fukuda ................ G08G 1/0145
2018/0302415 A1* 10/2018 Chakraborty ......... H04W 4/025
2019/0340767 A1* 11/2019 Koh .................. G06K 9/00201

OTHER PUBLICATIONS

Merrill, Shawn, et al. "Privacy Through Uncertainty in Location-Based Services." 2013 IEEE 14th International Conference on Mobile Data Management. vol. 2. IEEE. Jul. 30, 2013. (pp. 1-6).
Tu, Zhen, et al. "A New Privacy Breach: User Trajectory Recovery From Aggregated Mobility Data." IEEE/ACM Transactions on Networking 26.3. May 8, 2018. (pp. 1-16).

* cited by examiner

QUANTIFICATION OF PRIVACY RISK IN LOCATION TRAJECTORIES

FIELD

The following disclosure relates to assessment of privacy for probe data trajectories that are separated, split apart or otherwise anonymized.

BACKGROUND

The Global Positioning System (GPS) or another global navigation satellite system (GNSS) provides location information to a receiving device anywhere on Earth as long as the device has a substantial line of sight without significant obstruction to three or four satellites of the system. Location-based services (LBS) control features of an application based on location information from a GNSS or another source.

The increasing trend of smart phones and widespread integration of GPS devices in vehicles lead to availability of large pool of user location data including stay-points, check-ins and mobility traces. When such mobility data is aggregated in a centralized manner, it makes new applications such as traffic analysis and prediction possible. The aggregation and sharing of mobility traces data is called trajectory data publishing.

Trajectory data publishing is central to location data analysis and has wide applications including urban planning, LBSs, intelligent vehicles, logistics, and others. Though the usefulness of such publishing is unquestionable, the trade-off being made is privacy of contributing users and control over data.

The privacy factor is equally important, considering that user location data is personal and sensitive. When it is possible to trace back the contributing user it might lead to unintended consequences that harm the safety and security of contributors. Equally important is the role of regulation and compliance becomes crucial. Hence data publishing should not violate user rights and preserve their privacy. In practice the aggregation is oblivious to the contributing user and hence the responsibility or preserving user privacy is pushed to the service provider or aggregator.

SUMMARY

In one embodiment, a method for quantification of privacy risk in geographic data for probe devices in a geographic region includes receiving trajectory data in a plurality of probe points based on sequences of sensor measurements of the probe devices collected in the geographic region, identifying at least a trajectory identifier from each of the plurality of probe points, determining sub-trajectories from changes in the trajectory identifiers in the plurality of probe points, defining a candidate list for reconstruction of original trajectories from the sub-trajectories based on at least one concatenation parameter, calculating a reconstruction rate in the trajectory data, and providing the reconstruction rate for a quantification of privacy risk to an external device.

In another embodiment, an apparatus for quantification of privacy risk in geographic data for probe devices in a geographic region includes a database, a sub-trajectory module, a candidate list calculator, and a provision module. The database is configured to store trajectory data based on sequences of sensor measurements of a plurality of probe devices. The sub-trajectory module is configured to receive trajectory data in a plurality of probe points based on sequences of sensor measurements of the probe devices collected in the geographic region and determine sub-trajectories from changes in trajectory identifiers in the plurality of probe points. The candidate list calculator is configured to concatenate at least two of the sub-trajectories based on at least one concatenation parameter. The provision module is configured to calculate a reconstruction rate in the trajectory data and provide the reconstruction rate for a quantification of privacy risk to an external device.

In another embodiment, aa non-transitory computer readable medium includes instructions that when executed by a process are configured to perform identifying a plurality of sub-trajectories from a plurality of probe points collected in a geographic region, defining a candidate list for reconstruction of original trajectories from the sub-trajectories based on at least one concatenation parameter, performing a comparison of the candidate list to a ground truth trajectory for the geographic region, calculating a reconstruction rate in response to the comparison of the reconstructed trajectory to a ground truth trajectory for the geographic region, and generating a privacy rating message based on the reconstruction rate.

BRIEF DESCRIPTIONS OF THE DRAWINGS

Exemplary embodiments of the present invention are described herein with reference to the following drawings.

DETAILED DESCRIPTION

Figure 1:
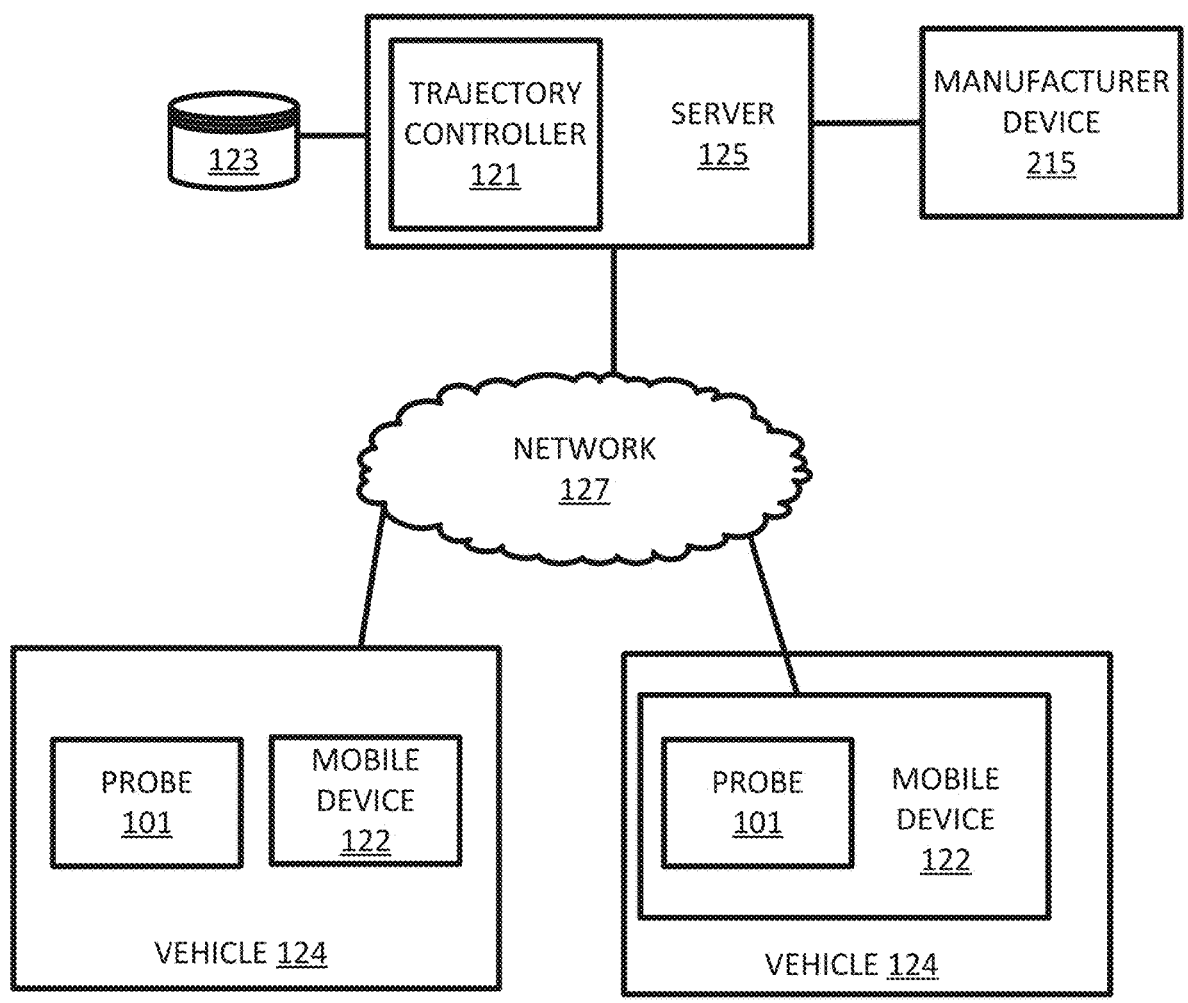
FIG. 1 illustrates an example system for the assessment of privacy risks in location trajectory data.

Location information is detected and stored by a variety of devices. Primarily, mobile devices such as vehicles, mobile phones or smart phones are continuously (or at frequent intervals) determining their current positions and reporting the location information. The location information may be logged by many different entities. Social media applications may track users for the purpose of identifying contacts or places to visit and may provide content in response to location. Mapping and navigation applications provide turn-by-turn directions or maps based on the location information. Crowd sourcing applications provide reviews on products or points of interest (POIs) according to location information. Vehicles may also collect location data independently, or in connection with, other applications.

In some examples, an intermediary such as a manufacturer associated with the vehicle or the mobile device may collect the location data from multiple devices. In some examples, an intermediary such as a map developer maintains the database of location information. The map developer may provide an open location platform that the other applications may access to obtain location information. The security and/or privacy of the location information depends on the security policies of each of the applications. A data breach by any of these applications may result in the identity and habits of the users being compromised.

To protect privacy, the location information may be stored anonymously using anonymous probe identities. That is, the identity of the user may be anonymous with respect to the log of location information. Providing anonymous data to LBSs and data publishing protects the identity of the users. The term anonymization in this context means that users access LBSs provided by centralized services without revealing their location trajectory to these providers. The anonymization component acts as a proxy for such users and acts on their behalf during service access to make sure that the providers cannot construct trajectories out of the access logs. Another prominent example is a trusted third party which is in possession of trajectory data aggregated from a huge collection of users, trying to publish on their behalf, without revealing their identities.

Techniques applied by the intermediary for anonymization may be to manipulate the underlying probe data. One example may include the assignment of a unique pseudo-ID to a probe device (pseudonymization). Subsequently, a new ID is generated when a pre-defined fixed/variable interval (temporal or spatial) has elapsed. The technique is usually accompanied by introducing artificial gaps via suppressing some probe points. This process splits a trajectory into (not-necessarily-continuous) sub-trajectories and may be assumed to protect the privacy of individuals. However, results may vary regarding the successfulness of the anonymization and the protection of privacy.

When trajectories are split into sub-trajectories, an adversary may be able to reconstruct original trajectories by concatenating the corresponding split parts back together, which is known as a type of linkage attack. This can be done via the identification of potential sub-trajectories that somehow match each other regarding associated properties, such as the timing information of starting and ending points, and maximum predicted distance that can be travelled based on reported/derived/estimated speed. The reconstruction process can somehow be improved, hence regarded even more severe of a risk, if additional background information would be available. The following embodiments address the privacy concerns regarding the aggregation, storage, analysis, and utilization of trajectories derived from probe data and anonymized by splitting and/or gap creation. The following embodiments assess and quantify how private split trajectory data is against reconstruction attack.

The following embodiments relate to several technological fields including but not limited to navigation, autonomous driving, assisted driving, traffic applications, and other location-based systems. The following embodiments achieve advantages in each of these technologies because the extent of the geographic area that accurate data can be provided to applications or third parties while maintaining the requisite security and privacy is improved. In each of the technologies of navigation, autonomous driving, assisted driving, traffic applications, and other location-based systems, the number of users that can be adequately served is increased. In addition, users of navigation, autonomous driving, assisted driving, traffic applications, and other location-based systems are more willing to adopt these systems given the technological advances in the data security and privacy protection.

FIG. 1 illustrates an example system for the assessment of privacy risks in location trajectory data that has undergone anonymity processing (anonymization). The trajectory data may be a sequence of points collected by a probe or mobile device. Anonymity processing may refer to the process in which data has been modified in an attempt to maintain the anonymity of the users or their privacy is otherwise protected from unauthorized users revealing the identity and actions of the users and protected from analysis of user habits (e.g., frequently visited places) revealing the identity and actions of the users. Anonymity prevents a tracking threat. An attacker that gains access to the data is prevented from determining identities from the data or revealing sensitive information.

In FIG. 1, one or more vehicles 124 are connected to the server 125 though the network 127. The server 125 includes a trajectory controller 121 that may modify a set of trajectory data to provide anonymization, for example, by splitting trajectories or creating gaps in the trajectory data and/or analyze the modified trajectory data to assess the success of the anonymization, for example, by determining whether there is a risk to privacy.

The vehicles 124 may be directly connected to the server 125 or through an associated mobile device 122. A map developer system, including the server 125 and a geographic database 123, exchanges (e.g., receives and sends) data from the vehicles 124. The mobile devices 122 may include local databases corresponding to local maps, which may be modified according to the server 125. The local maps may include a subset of the geographic database 123 and are updated or changed as the vehicles 124 travel. The mobile devices 124 may be standalone devices such as smartphones or devices integrated with vehicles. Additional, different, or fewer components may be included.

Each vehicle 124 and/or mobile device 122 may include position circuitry such as one or more processors or circuits for generating probe data. The probe points are based on sequences of sensor measurements of the probe devices collected in the geographic region. The probe data may be generated by receiving GNSS signals and comparing the GNSS signals to a clock to determine the absolute or relative position of the vehicle 124 and/or mobile device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The mobile device 122 may act as probe 101 for determining the position or the mobile device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, every 100 milliseconds, or another interval). In this case, there are additional fields like speed and heading based on the movement (i.e., the probe reports location information when the probe 101 moves a threshold distance). The predetermined time interval for generating the probe data may be specified by an application or by the user. The interval for providing the probe data from the mobile device 122 to the server 125 may be the same or different than the interval for collecting the probe data. The interval may be specified by an application or by the user.

Communication between the vehicles 124 and/or between the mobile device 122 and the server 125 through the network 127 may use a variety of types of wireless networks. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

In some examples, the trajectory controller 121 receives anonymized trajectory data from another device. For example, the trajectory controller 121 may be a collection point for anonymized trajectory data from other servers or devices. For example, multiple manufacturers may generate the anonymized trajectory data at a manufacturer server, which forwards the anonymized trajectory data to the trajectory controller 121. Alternatively, the anonymized trajectory data may be generated at the trajectory controller 121. In any of these cases, the anonymization of the trajectory data may include splitting the trajectories according to geographical sequence and/or time sequence. Other criteria may be used for splitting trajectories.

The trajectories may be defined according to one or more data fields in the probe data. For example, the trajectories may be a series of probe points or a vector and may include a location of the mobile device and/or a session identifier or a trajectory identifier. The location may include a geographic coordinate of the location of the mobile device or position sensor when the probe data point was generated. For example, the location may include a latitude and longitude. The session identifier may be an identifier of the series of probe data points produced by the mobile device. In other words, different mobile devices may be associated with different session identifiers that are included in the probe points. The trajectory identifier may be the session identifier or derived from the session identifier such that the trajectory identifier may also be changed or incremented according to time or geography.

The trajectory controller 121 is configured to analyze the anonymized trajectory data to calculate a privacy risk. The data may have been anonymized by the server 125 or by another device such as a manufacturer device 215. The anonymization process may involve modification of trajectory data in order to define sub-trajectories. The anonymization process may include introducing artificial gaps into the trajectory. For example, the anonymization process may remove probe points to create artificial gaps in the trajectory. The anonymization process may split a trajectory into sub-trajectories. In each of these examples, the sub-trajectories are defined in the trajectory data by modifying trajectory identifiers in the data.

The trajectory controller 121 receives probe points, such as a series of probe points in trajectory data. The trajectory controller 121 may include or be in communication with the database 123 which is configured to store trajectory data based on sequences of sensor measurements. The trajectory controller 121 identifies at least a trajectory identifier from each of the probe points. The trajectory controller 121 analyzes the trajectory identifiers in order to determine sub-trajectories defined in the anonymization process. The trajectory controller 121 determines sub-trajectories from changes in the trajectory identifiers in the probe points. In one example, the trajectory controller 121 includes or is in communication with a sub-trajectory module configured to receive trajectory data based on sequences of sensor measurements collected in the geographic region and determine sub-trajectories from changes in trajectory identifiers.

The trajectory controller 121 defines a candidate list for reconstruction of original trajectories from sub-trajectories based on at least one concatenation parameter. In one example, the trajectory controller 121 includes or is in communication with a candidate list calculator configured to reconstruct at least two of the sub-trajectories based on at least one concatenation parameter. The candidate list calculator is configured to compare a first sub-trajectory and a second sub-trajectory based on the at least one concatenation parameter.

The concatenation parameter is indicative of a likelihood that two or more sub-trajectories could be reconstructed to form one of the original trajectories. The concatenation parameter may include a maximum estimated distance for a traveling distance from a first sub-trajectory and a second sub-trajectory. The concatenation parameter may include a time difference for a gap length between the first sub-trajectory and the second sub-trajectory. The concatenation parameter may include a product of a time difference to sampling frequency match and a modal value for a sampling frequency of the first sub-trajectory. The concatenation parameter may include a lower bound of sampling frequency ratio for a sampling frequency of the first sub-trajectory and a sampling frequency of the second sub-trajectory.

The trajectory controller 121, or a provision module associated with the trajectory controller 121, calculates a reconstruction rate in the trajectory data. In one example, the reconstruction rate is determined based on a ground truth data set. The ground truth data set may include trajectory data that describes the geographic region before the trajectories were anonymized. The trajectory controller 121 may include a ground truth module configured to determine whether a ground truth data set is available for the candidate list for reconstruction of the sub-trajectories. When the ground truth data set is available, the trajectory controller 121 compares the candidate list to the ground truth data set. The trajectory controller 121 may calculate the reconstruction rate as the number of trajectories in the ground truth data set that were correctly associated by the candidate lists.

The trajectory controller 121 provides the reconstruction rate for a quantification of privacy risk to an external device. The trajectory controller 121 may generate an output of concatenated sub-trajectories for the candidate list. The output may be an image or an output file included in the quantification of privacy risk. The output may be a gap recommendation calculated based on statistics for the candidate list and the reconstruction rate.

Figure 2:
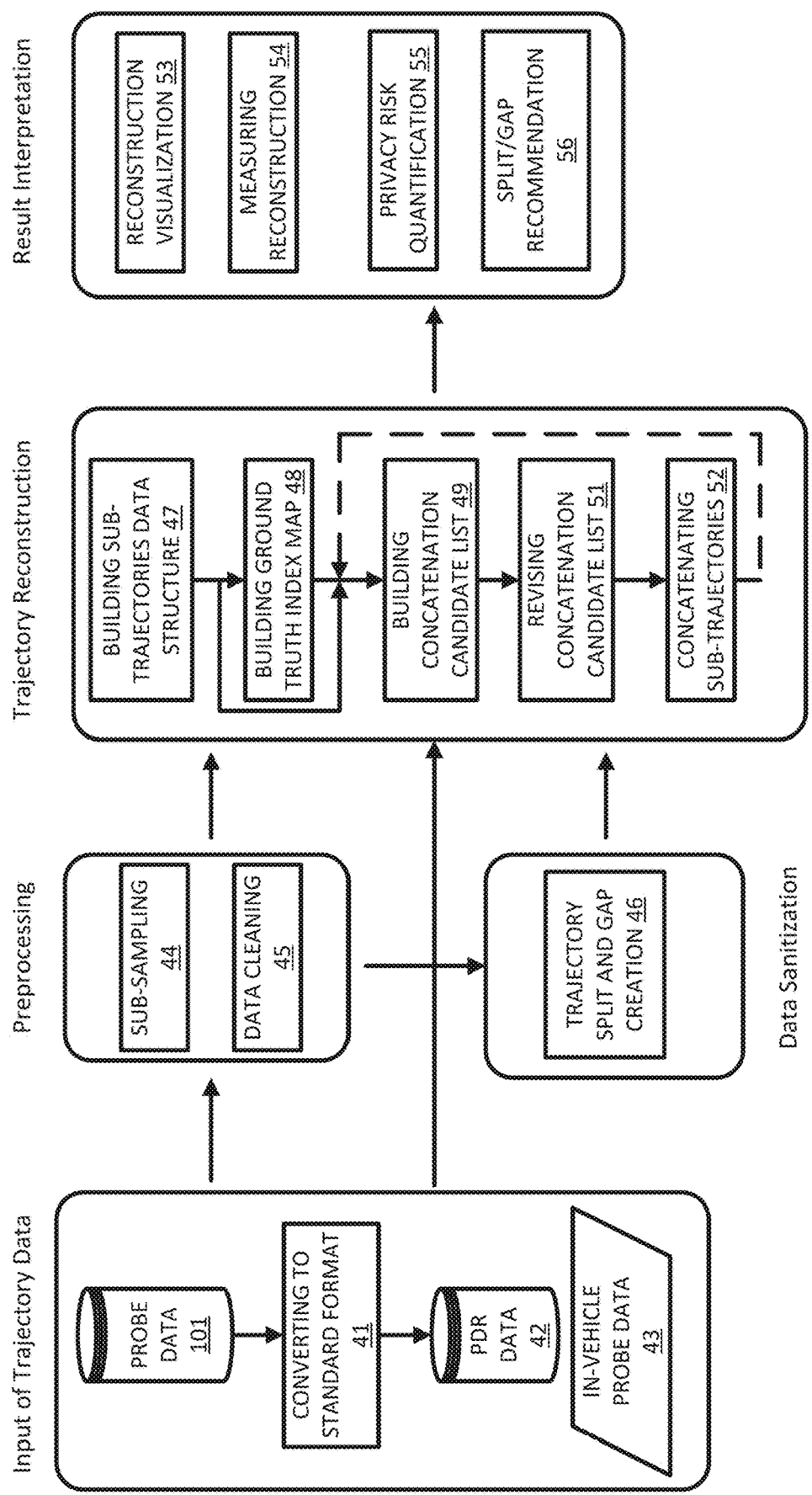
FIG. 2 illustrates an example diagram of the trajectory controller or other components of the system of FIG. 1.

The following embodiments include more detailed examples to analyze the anonymization of trajectories to quantify privacy risks. FIG. 2 illustrates an example implantation for the trajectory controller 121 and/or central server 125 including multiple stages: input of trajectory data, preprocessing, data sanitization, trajectory reconstruction, and result interpretation.

Input Trajectory Data

The stage for input of trajectory data may include probe data 101, a conversion block 41 for converting to a standard format, a probe data repository (PDR) 42, and an in-vehicle probe data 43. The PDR 42 may store the probe data in a standard format. The trajectory controller 121 may generate, identify or extract probe data points from the probe data. The trajectory controller 121 may receive raw probe data from a Probe Access Gateway (PAG) or a PDR server, which is a specialized device for providing the probe data points to the trajectory controller 121. The raw probe data may include data streamed from the collection sensor without substantial filtering or analysis. In one example, the raw probe data may include probe data that has not been anonymized.

The trajectory data may include one or more probe data fields. In one example, the trajectory data includes an expanded list of probe data fields (e.g., 21 data fields) including a first set of 8 fields extracted by the trajectory controller 121. Specific examples of the trajectory data may include PDR datasets received from the PDR 42 and/or the PAG.

In one example, the expanded list of probe data fields includes the following groups. Fields 1-8 are directly extracted from data received from the Probe Access Gateway (PAG data) and include SCHEMA_ID, SOURCE, SESSION_ID, SAMPLE_DATE, LATITUDE, LONGITUDE, HEADING, and SPEED. Fields 9-17 are output as the result of the streaming map matching phase and include MATCHED LATITUDE (MM_LAT), MATCHED LONGITUDE (MM_LON), MATCHED DISTANCE (MM_DIST), MATCHED LINK (MM_LINKPVID), MATCHED LINK DIRECTION (MM_LINKPVIDDIR), MATCHED NODE (MM_NODEDISTREF), MM_NODEDISTNREF, and TVALUE. Fields 18-21 are related to the trajectory generation and include TRAJECTORY_ID, POSITION, TIME_DIFFERENCE, and DISTANCE. TRAJECTORY_ID is the primary reference to distinguish between trajectories and all subsequent processing is based on that.

The trajectory data may include a reduced list of probe data fields such as described in Table 1. The subset of the probe data fields in the standard data format may be used for the standard trajectory data files. The standard format may include the 7 primary fields listed in Table 1. In addition, the trajectory controller 121 may be configured to convert data that is provided by Original Equipment Manufacturers (OEMs), and may be incompliant with the standard PDR format, for which data conversion is necessary to extract and make correspondence with the primary data fields for the standard data format.

TABLE 1

| Field | Type | Format | Unit | Range | Description | Note | Example |
|---|---|---|---|---|---|---|---|
| SOURCE | string | | | | Probe provider | | PROVIDER1 |
| SESSION_ID | string | | | | Probe device identifier | This is the identifier that providers use to group probe data points, ideally by a single device. However, some providers may opt to group multiple devices under a single SESSION_ID. This can have side effects on preciseness of trajectory generation. | 3d3f5d6be980fa b089084f0daa39 5b0c |
| SAMPLE_DATE | int | Unix Time | seconds (since Unix Epoch) | | Probe GPS timestamp | The data and time that the probe point was captured by the device. Frequencies vary by providers. UNIX Epoch time is a system for describing a point in time, defined as an approximation of the number of seconds that have elapsed since 00:00:00 Coordinated Universal Time (UTC), Thursday, 1 January 1970. Every day is treated as if it contains exactly 86400 seconds. | 1499702962 |
| LATITUDE | float | | decimal degrees | [−90, 90] | Probe coordinate lat | The number is ensured to have at least five decimal places which pinpoints a location to within accuracy of a meter. | 52.51794 |
| LONGITUDE | float | | decimal degrees | [−180, 180] | Probe coordinate lon | The number is ensured to have at least five decimal places which pinpoints a location to within accuracy of a meter. | −87.66005 |
| SPEED | float | | kilometer per hour (kph) | | Probe speed | Speed at which the object was travelling at the time of the transmission. | 40.0 |
| TRAJECTORY_ID | string | | | | Universally Unique IDentifier for the trajectory (UUID ver.4) | A unique TRAJECTORY_ID usually corresponds to a unique SESSION_ID combined with the provider (SOURCE), however it could be that a new TRAJECTORY_ID is created when there is no change in the SESSION_ID + SOURCE. This only happens if TIME_DIFFERENCE between consecutive points is greater than 12 hours or DISTANCE between consecutive points is greater than 100 km. | a54deb36-2c34-4467-a292-17513830eeea |

The trajectory controller 121 is configured to perform a map matching phase on the raw probe points. Map matching is point-based (e.g., without the use of trajectory data) and is suitable to run on streaming data. The trajectory controller 121 may compare individual probe points to a gird of coordinates (e.g., longitude and latitude). Trajectories are generated after map matching.

The trajectory controller 121 is configured to perform a data cleaning phase. In the data cleaning phase, probe points in trajectories are checked for various quality metrics, and/or potential erroneous data points are flagged out. Such erroneous data points may include duplicate points or points with invalid reported speed. Other data cleaning techniques are described in the preprocessing section as follows.

Preprocessing

The preprocessing stage may include one or more algorithms or processes that are applied to the inputted trajectory data before the trajectory-related processes. The preprocessing stage may include one or more algorithms or processes to modify the input trajectory data to be compatible with the standard format. The preprocessing stage may include one or more algorithms or processes for making trajectory data from one source or manufacturer compatible with trajectory data from another source or manufacturer. The preprocessing stage may include a sub-sampling module 44, a data cleaning module 45, or modules for other techniques. Data stored in PDR servers may need preprocessing before being fed into the reconstruction module. There are two main preprocessing phases that are described as follows.

The sub-sampling technique may include a selection of values from the input trajectory data at a predetermined interval or frequency. The predetermined frequency may be set to ensure compatibility between different trajectory data sets.

The sub-sampling module 44 may downsample, or otherwise adjust the probe data frequency in PDR trajectory datasets. To accomplish this, extra probe points in sub-trajectories are suppressed to comply with a new sampling frequency set by user. For example, the sub-sampling module 44 may identify one or more probe data points in response to the predetermined frequency and remove these identified probe data points from the input trajectory data. This preprocessing is needed when identical/matching sampling frequencies are required for different probe data providers to enable results' comparison or when a trajectory dataset is simulated with a specific sampling frequency.

In sub-sampling, the last probe data point in each sub-trajectory can be handled in a special manner to enable different possibilities for reconstruction. The data cleaning module 45 is configured to sub-sample the probe points according to a preset sampling frequency. The data cleaning module 45 may be configured to handle the last probe data points by doing nothing or ignoring special handling of the last probe data. The data cleaning module 45 may be configured to handle the last probe data points to always include the last probe data point, or a predetermined number of last probe data points. In this manner, the data cleaning module 45 ensures that the last probe data is always included in the output dataset. The data cleaning module 45 may be configured to handle the last probe data points dynamically. For example, the data cleaning module 45 may determine whether to ignore or include the last probe data points, or predetermined number of last probe data points based on a comparison. The data cleaning module 45 may compare the time difference between the last probe point and the previous probe data point. When the difference is greater than a threshold amount of time, the last probe data point or points is retained and included in the sub-sampled trajectory data by the data cleaning module 45. When the difference is less than the threshold amount of time, the last probe data point or points is discarded or ignored by the trajectory controller 121. In one example, the threshold may be half the time interval for the predetermined frequency (new sampling frequency). That is, the data cleaning module 45 is configured to, when the difference is more than or equal to half of the value of new sampling frequency, preserve the last probe point or points, and otherwise discard the last probe point or points. In some examples, duplicate probe points in the input dataset (points with "TIME_DIFFERENCE" value of zero) are discarded to address redundancy.

In addition or in the alternative, the trajectory controller 121 may perform data cleaning processes or algorithms. For any of the following action, the trajectory controller 121 may filter the probe points according to a preset filtering parameter. The data cleaning process may include one or more of the following actions, which may be selectable based on context and user preferences: removing redundant/unused data fields in trajectory dataset, removing invalid probe points (no device/session ID, no/invalid coordinates, etc.), removing improbable probe points (e.g., arising from data acquisition errors), identifying and removing duplicate probe points, identifying and removing stay probe points, identifying and removing empty and/or short trajectories (insufficient probe points) including original trajectories and trajectories deemed as empty/short after probe points removal, removing trajectories with major gaps (no probe points within a long interval), correction of time difference, distance, and speed data fields based on previous data in case of inaccuracies, and addition of missing data by analyzing and deriving from available data. The trajectory controller 121 accesses the preset filtering parameter and performs one or more of the preceding actions in response to the preset filtering parameter.

Data Sanitization

The data sanitization stage may include an additional modification of the trajectory data by the trajectory controller 121 by module 46 for trajectory split and gap creation. The data sanitization process involves deliberately eliminating probe data points from the trajectory data (e.g., original PDR datasets). That is the trajectory controller 121 may remove certain probe data points according to a predetermined pattern. The probe data points may be removed according to sequence (e.g., every nth probe data point is removed, with n being an integer selected by a user or automatically by the trajectory controller 121). The probe data points may be removed according to quantity (e.g., after a preset number of probe points are identified, the remining probe points are removed). The process may be applied when raw (non-anonymized) datasets are considered for reconstruction attacks.

The data sanitization may be performed to create different data sets compatible with different ground truth data sets. With this technique, different experimental settings (defining split/gap parameters) may be used to calculate the corresponding reconstruction success rates. Nevertheless, it may be applied on already-anonymized datasets as well to enable customized gap settings.

The module 46 is configured to split trajectories into sub-trajectories based on temporal or spatial intervals. The module 46 may define sub-trajectories temporally according to a time period. The module 46 may define sub-trajectories spatially according to geographic boundaries or regions.

Hence, it is possible to later trace back a reconstructed trajectory to the original trajectory data and verify the accuracy of the results as well as assessing the reconstruction success rate both for individual trajectories and the whole dataset. Several input parameters control the splitting process including provider selection, split/gap type (spatial/temporal and fixed/variable), split/gap interval length or range, and a parameter specifying whether trajectories with major gaps should be considered. By default, a major gap is defined empirically as two times the median value of the sampling frequencies of probe points for a trajectory. Two output datasets are created as the result of the splitting module: 1) dataset containing the required data fields for split sub-trajectories, and 2) an index dataset that contains, for each trajectory, the TRAJECTORY_ID along with the number of parts that was created during the split process. The creation of IDs for SESSION_IDs and TRAJECTORY_IDs of sub-trajectories follows a simple convention: original IDs are appended with #<part_number> or label information. This makes it possible to track sub-trajectories easily in subsequent processing.

The module 46 may also calculate and compile statistics such as 1) the total number of trajectories contained in the input file, 2) the total number of trajectories skipped for the splitting process based on user's input (trajectories from providers of no-interest), 3) the total number of trajectories eligible for the splitting process based on user's input, 4) the total number of eligible trajectories that were actually split into two or more parts, 5) the total number of eligible trajectories that were not split due to their length (whole trajectory fits into one part), and/or 6) the total number of eligible trajectories discarded due to the detection of one or more major gaps.

Trajectory Reconstruction

The trajectory reconstruction stage may include a sub-trajectories building module 47 for building sub-trajectories data structure, a ground truth building module 48 for building a ground truth index map, a candidate building module 49 for building a concatenation candidate list, a revision module 51 for revising the concatenation candidate list, and a concatenation module 52 for concatenating sub-trajectories. The ground truth data set in includes a dataset, a matrix, or other set of associations that describes how the trajectories originally fit together and/or are arranged in the geographic region before the trajectories were anonymized to split apart trajectories. The concatenation candidate list is a running list of possible sub-trajectories that may be combined to recreate the trajectories.

The trajectory reconstruction stage receives the trajectory dataset (optionally after preprocessing and/or sanitization, together with ground truth data if available). Sub-trajectories that match each other are detected and sequences are reconstructed back to form (segments of) original trajectories.

The trajectory reconstruction stage, via the building module 47, is configured to build sub-trajectories from the trajectory data set. The building module 47 is configured to check at least one property to ensure correct processing in subsequent steps. Adjustment to the data is also made, if necessary, based on checking the at least one property.

The at least one property may be the trajectory identifier (e.g., TRAJECTORY_ID). The building module 47 examines probe data to identify when the trajectory identifier changes from one probe point to another probe point. When sequentially processing probe points, any change in the TRAJECTORY_ID signals the beginning of a new sub-trajectory. To check for this property, the building module 47 stores the data fields for the last probe point read from the trajectory dataset. As soon a change is detected, previously accumulated data points, if any, are stored as a sub-trajectory.

The at least one property may include other identification fields. For example, the at least one property may include the source field (e.g., SOURCE) and the session identifier (SESSION_ID). The source field and the session identifier are inspected to ensure the validity of input data. In case a change is not detected in these fields regarding the TRAJECTORY_ID, a warning is issued. This situation can be accepted in two cases as detailed in Table 1. On the other hand, if a change is detected in SOURCE+SESSION_ID while TRAJECTORY_ID does not imply such a change, the processing of the input file is stopped.

Subsequently, a check for the position (sequence) number of probe points is performed to detect missing data, if any. The building module 47 may perform one or more measurements to check the validity of probe points. In one example, the parameter for time difference (TIME_DIFFERENCE) is accessed and compared for sequential pairs of probe points and/or non-sequential pairs of probe points. The building module 47 compares the time difference values to identify predetermined values such as zero. A zero indicates that the probe points in the pair that is being analyzed are duplicates. The building module 47 may skip probe points that are duplicates of previous points or other points.

In another example, higher precision may be achieved using a test that checks the mapped matched coordinates of the probe points. The time difference test for duplicates may be performed only in pairs of points map matched to similar or nearby map matched coordinates. Additionally, erroneous reported speed of zero will interfere with subsequent processing, thus the reported speed is adjusted in these cases. This may be performed by calculating a correct speed value based on the distance between two corresponding probe points and the reported time difference. To measure an accurate distance, the Haversine formula may be used and the calculated value is also converted from m/s to km/h to be consistent with other data values.

Figure 3:
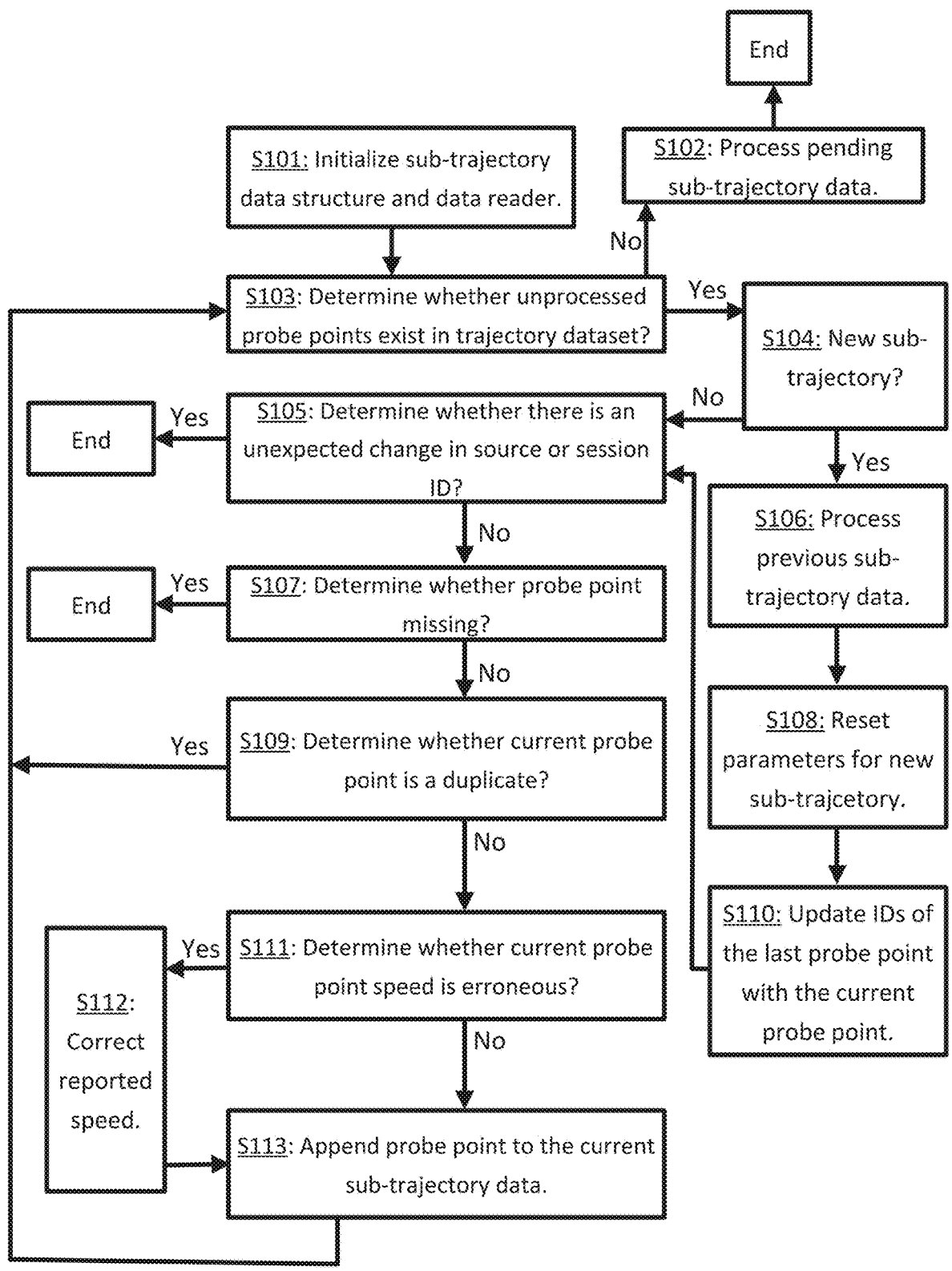
FIG. 3 illustrates a flow chart for an example algorithm to build sub-trajectories for a reconstruction algorithm.

FIG. 3 illustrates an example flowchart for a first phase of a trajectory reconstruction algorithm to build sub-trajectories from input trajectory data set.

At act S101, the building model 47 initializes at least one component of the trajectory reconstruction stage. The building model 47 may initialize the sub-trajectories data structure by defining a size of the data structure and clearing any existing values from the data structure. The building model 47 may initialize the data reader (e.g., comma separated values reader) by defining the contained and required data fields in the trajectory data set.

At act S103, the building model 47 determines whether unprocessed probe points exist in the trajectory dataset. If there are not probe points remaining to analyze, then the process proceeds to act S102 to processing pending sub-trajectory data, and then the process ends. If there are probe points remaining to analyze, then the process proceeds to act S104.

At act S104, the building model 47 determines whether the probe point indicates a new sub-trajectory. The building model 47 compares a trajectory identifier (TRAJECTORY_ID) from a first probe point to a trajectory identifier from a second probe point. The second probe point may be the immediately subsequent probe point or a later probe point. If there is a new sub-trajectory, the process proceeds to act S106. If there is not a new sub-trajectory, the process proceeds to act S105.

At act S106, the building model 47 processes previously accumulated sub-trajectory data points. The building model 47 creates the corresponding data object and stores the required attributes, such as the starting and ending points of a sub-trajectory. In addition, the building model 47 may reset parameters for the new sub-trajectory at act S108, and update IDs of the last processed probe point with the IDs of the current probe point at act S110, before returning to act S105.

At act S105, the building model 47 determines whether there is an unexpected change in the source or session identifier. If there is an unexpected change in the source and/or the session identifier, the process stops. If there is not an unexpected change in the source and the session identifier, the process proceeds to act S107.

At act S107, the building model 47 determines whether a probe point is missing. If a probe point is missing, the process stops. If no probe point is missing, the process proceeds to act S109.

At act S109, the building model 47 determines whether the current probe point is not a duplicate. If the current probe point is a duplicate, the process returns to act S103. If the current probe point is not a duplicate, the process proceeds to S111 where the building model 47 determines whether the current probe speed is erroneous. The probe point speed may be erroneous when the speed is at or within a small predetermined range of zero. If current probe point is erroneous, then the building model 47 corrects the erroneous reported speed at act S112. The building model 47 may substitute a default speed or calculate a replacement speed to replace the erroneous reported speed. After act S112 or act S111, the building model 47 appends the probe point to the current sub-trajectory data at act S113.

The trajectory reconstruction stage, via the ground truth building module 48, is configured to build a ground truth index map. The index map is built for the ground truth data in case raw trajectory dataset is available in PDR for the sanitized dataset. The map is populated from the extra information created during the sanitization process and relates TRAJECTORY_IDs to a collection of data fields containing information about number of parts in original trajectories as well as number of concatenations that will occur during reconstruction. This map data structure is later updated with statistics regarding reconstruction success rates.

The trajectory reconstruction stage, via the candidate list module 49, the revision module 51, and the concatenation module 52, is configured to build the concatenated candidate list. For reconstruction, the candidate list module 49 checks sub-trajectories in order of their starting time. It should be noted that the sub-trajectories are sorted in time in ascending order (e.g., the first searching criterion). Stitching of sub-trajectories is carried out in consecutive rounds and a concatenation buffer holds the indices of elements to be stitched together in each round of concatenation. In each round, the indices of potential candidates that can be considered as a continuation part for the last sub-trajectory are collected in the concatenation buffer. In case there is still unprocessed sub-trajectories left, a new round of concatenation is scheduled. Whenever a new sub-trajectory is appended to the current concatenation buffer, the quest for new potential candidates follows until no eligible candidate is found. At this point, the sub-trajectories in the concatenation buffer are stitched together and the buffer is reset for a new round.

Figure 4:
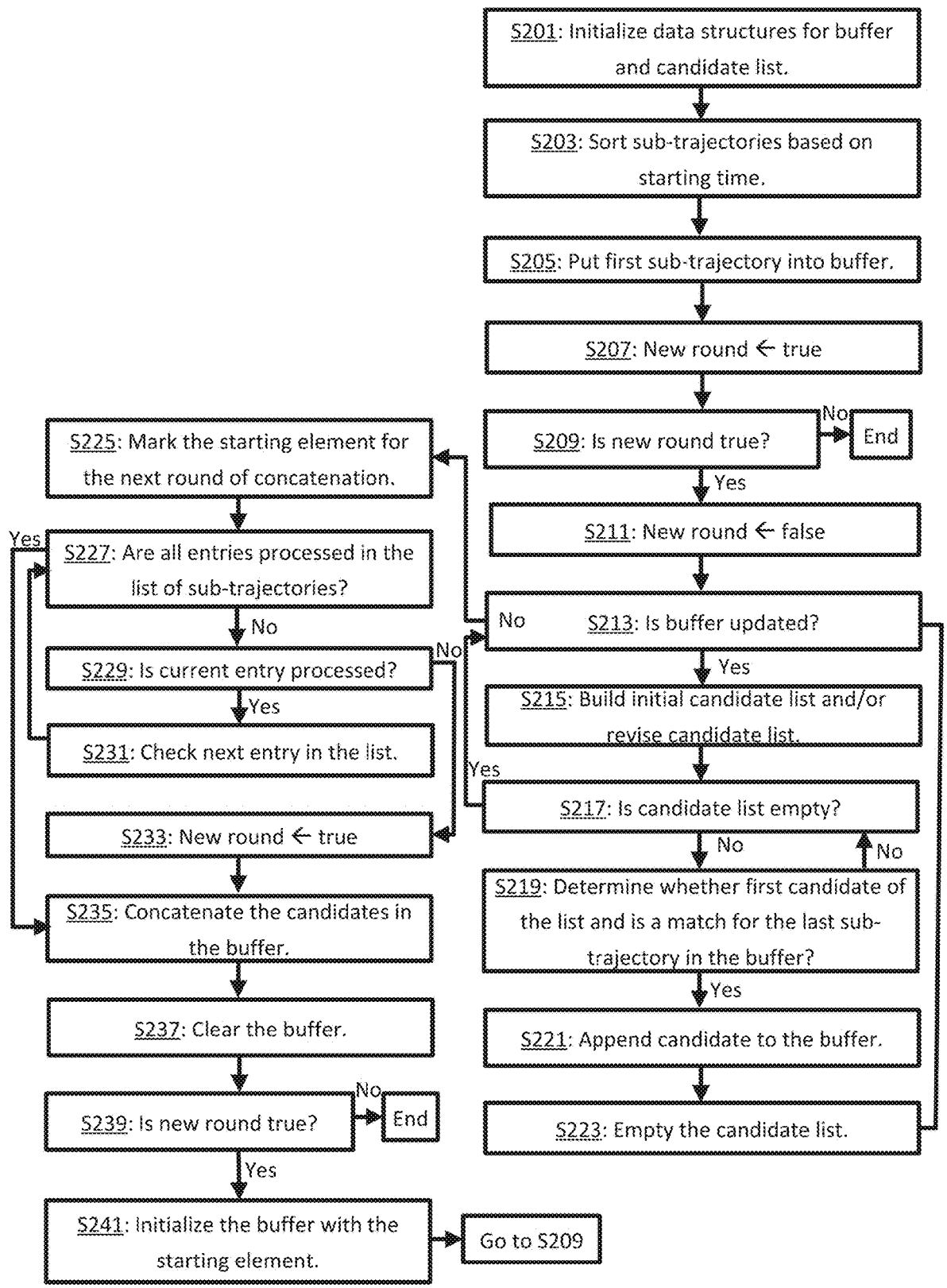
FIG. 4 illustrates a process for a loop of an example reconstruction algorithm.

FIG. 4 illustrates a process for the main loop of the reconstruction algorithm for the sub-trajectories. The loop through the candidate list module 49, the revision module 51, and the concatenation module 52, as shown by the dotted line in FIG. 2 is illustrated in more detail by FIG. 4.

At act S201, the trajectory controller 121, by way of the trajectory reconstruction stage initializes one or more data structures for the purpose of trajectory reconstruction. The concatenation buffer may be initialized according to at least one buffer parameter such as a buffer quantity parameter that defines the number of sub-trajectories (e.g., buffer entries) stored in the buffer. The concatenation buffer may be initialized according to at least one buffer parameter such as a field size parameter that defines the type and size of the fields in the buffer.

In one example, the concatenation candidate list includes all sub-trajectories for a geographic region that can potentially be appended to the last sub-trajectory in the concatenation buffer. The eligibility for concatenation may be based on a threshold parameter. The initial threshold may include length, distance to another sub-trajectory, time span of the sub-trajectory, or another requirement.

At act S203, the candidate list module 49 is configured to sort sub-trajectories based on the timestamps associated with the sub-trajectories. In example, the sub-trajectories are sorted based on starting time. The starting time may be the timestamp for the earliest probe point in the sub-trajectory. The candidate list module 49 generates a list of sub-trajectories in ascending order of time.

At act S205, the candidate list module 49 is configured to put the first sub-trajectory into the concatenation buffer. For example, the candidate list module 49 may initialize the concatenation buffer with the first sub-trajectory in the sorted list.

Subsequently or at the same time, at act S207, the flag (e.g., new round or new_concatenation_round) indicating a round of concatenation is scheduled is set to true.

At act S209, which may also be preceded by act S241, the candidate list module 49 is configured to read the flag and determine whether the flag is true or false. When the flag is false, the process ends. When the flag is true (i.e., while the round of concatenation is scheduled), acts S211-S223 are performed. At act S211, the candidate list module 49 sets the flag to false, and proceeds to act S213.

At act S213, the candidate list module 49, determines whether the concatenation buffer is updated. While the concatenation buffer is updated, the candidate list module 49 builds the initial concatenation candidate list at act S215. In addition, the candidate list module 49 or the optional revising concatenation candidate list module 51 may revise concatenation candidate list if required.

At act S217, the candidate list module 49 determines whether the concatenation candidate list is empty. While the concatenation list is not empty, the candidate list module 49 retrieves the first candidate from the concatenation candidate list and determines whether the first candidate is a match for the last sub-trajectory in the concatenation buffer, at act S219. Two sub-trajectories in the concatenation candidate list may be determined as a match when one or more matching requirements are met. The matching requirements may include a maximum estimated distance (MED), a time difference to sampling frequency match (TDSFM), lower bound of sampling frequency ratio (LBSFR), gap lengths (GLs) or other parameters. The matching requirements are described below in more detail.

If it is not a match, the process returns to S217, and if there are other candidates, retrieves the next candidate and determines whether it is a match. The process loops between S217 and S219. When the candidate under consideration is a match, the candidate list module 49 appends the candidate to the concatenation buffer. Then, at act S223, the candidate list is emptied.

Returning to act S225, when the candidate list module 49 determines the concatenation buffer is not updated, the process marks the starting element for the next round of concatenation as the one in the list of sub-trajectories immediately following the first sub-trajectory in the concatenation buffer.

In act S227, the candidate list module 49, determines whether all entries processed in the list of sub-trajectories. While elements in the list of sub-trajectories are not exhausted (i.e., not all entries are processed), the process determines whether the current entry is processed. If the starting/current element is already processed, then the next element in the list is set as the starting element and the process checks the next entry in the list at act S231.

When the current entry is not processed in act S229, the process proceeds to act S233 where the flag is set back to true. The flag indicates that a round of concatenation can be scheduled. The process exits the loop here for processing the entries in the list.

When elements in the list of sub-trajectories are exhausted (i.e., all entries are processed), at act S227, the process proceeds to act S235. In act S235, the concatenation sub-trajectory module 52 concatenates or performs the stitching of the candidates in the concatenation buffer. After stitching is complete, the concatenation sub-trajectory module 52 clears the concatenation buffer.

In act S239, the concatenation sub-trajectory module 52 determines whether the flag is still true. If not, the process ends. If the flag is true (i.e., another round of concatenation is scheduled, then the starting element is set as the initial candidate in the concatenation buffer and a flag indicating that the concatenation buffer is updated is set, at act S241. The process returns to S209 and repeats as long as the flag is set to true indicating a round of concatenation is scheduled. While there are still unexamined entries left in the list of sub-trajectories, a new round of concatenation is scheduled. Current round of concatenation is closed when there is no possibility to append a new sub-trajectory to the current concatenation buffer.

The concatenation candidate list may be built according to one or more matching requirements or adjusting parameters that affect the way sub-trajectories are selected as candidates for concatenation. These parameters are not limited to but may include the maximum estimated distance (MED), the time difference to sampling frequency match (TDSFM), the lower bound of sampling frequency ratio (LBSFR), the gap length (GL) or other parameters.

The MED indicates the adjusting value that is multiplied to the calculated maximum possible travelling distance from the ending point of a sub-trajectory. This maximum possible distance is calculated based on the reported speed for the ending probe point of the sub-trajectory and is used to check whether the starting point of a potential continuing sub-trajectory falls within the proximity of the current sub-trajectory. As an example, MED set to 1.1 for a maximum possible distance calculated as 300 meters means that a potential sub-trajectory is accepted only as the continuation of the current sub-trajectory if its starting probe point is at most a threshold distance (e.g., 330 meters) away from the location of the ending probe point of the current sub-trajectory. Note that 1.0 specifies the strictest value for MED.

The TDSFM indicates the adjusting value that is multiplied to the maximum allowed timing frame for the starting probe point of a potential continuing sub-trajectory. As an example, if the modal value of the sampling frequency for a sub-trajectory is calculated as 5.0, (i.e. a new probe point is expected every 5 seconds), and TDSFM is set to 2, it means that a potential sub-trajectory is accepted as the continuation of the current sub-trajectory only if the starting probe point of a potential continuing sub-trajectory is within at most 10 seconds from the ending probe point of the current sub-trajectory.

The LBSFR indicates the minimum acceptable lower bound value for the ratio of the sampling frequencies of the potential matching sub-trajectories. This is an important parameter because in concatenating two sub-trajectories, there should be a logical correspondence (match) between their sampling frequencies. The ratio is always calculated by dividing the smaller sampling frequency to the larger one. Thus, an upper bound value for the ratio is 1. LBSFR determines the lower bound value for this ratio. The higher the LBSFR, the stricter the matching will be. Setting LBSFR to 1 means that the sampling frequencies should strictly be equal otherwise no concatenation occurs. If LBSFR is set to zero, the sampling frequency check is simply ignored in the stitching process. This can be beneficial in case there are considerable variations in the sampling frequencies of individual providers and/or when there is sub-trajectory data from only one provider (no sampling frequency match is needed).

The GL indicates the values that act as hints for the minimum and/or maximum gap intervals (temporal) between sub-trajectories incurred during data sanitization. These values may be set by user manually or derived automatically by inspecting the dataset prior to reconstruction attack. The key parameter in selection, time tolerance, is the interval that is still accepted for a sub-trajectory to be a potential candidate for concatenation and that depends directly on TDSFM. In case a maximum gap hint value is defined and utilized, the time tolerance can be extended accordingly to accommodate a longer scope for the selection. When sequentially going through the list of ordered sub-trajectories, the trajectory controller 121 may skip the ones that are already processed. In addition to calculating the interval between potential concatenation points, the trajectory controller 121 may also calculate the distance between these points, and based on the last known speed of a sub-trajectory, checks whether the starting point of a potential candidate is reachable by that speed. The following presents a summary of steps:

1. Set $P_1$ as the ending probe point of the last sub-trajectory in the concatenation buffer
2. Calculate time_tolerance as the sampling frequency of the last sub-trajectory in the concatenation buffer multiplied by TDSFM
3. Adjust time_tolerance if maximum gap hint value allows a larger interval to be considered compared to the one that TDSFM does
4. Set Cur_ST as the sub-trajectory immediately following the last sub-trajectory in the concatenation buffer
5. While Cur ST exists
    a. If Cur_ST is already processed, then set Cur_ST as the next sub-trajectory in the list and return to the beginning of the loop (5)
    b. Set $P_2$ as the starting point of Cur_ST
    c. Calculate the time_difference between $P_2$ and $P_1$
    d. If time_difference is less than minimum gap hint value, then set Cur_ST as the next sub-trajectory in the list and return to the beginning of the loop (5)

e. If time_difference is greater than time tolerance, then exit the loop (5)
f. Calculate the distance between $P_2$ and $P_1$
g. Calculate maximum_estimated_distance as the speed of $P_1$/3.6*time_difference*MED
h. If distance is greater than maximum estimated distance, then set Cur_ST as the next sub-trajectory in the list and return to the beginning of the loop (5)
i. Append Cur_ST to the concatenation candidate list The only condition that is checked for candidates after building the list is related to the sampling frequencies of the to-be-concatenated sub-trajectories. The two sampling frequencies are expected to kind of match, ideally be identical. For this check, the trajectory controller 121 calculates the ratio of the two values in such a way that is upper-bounded by 1. The lower threshold for the ratio, as set via LBSFR, is used to filter out irrelevant sampling frequencies. In case LBSFR is set to zero, no test would be carried out and the first candidate in the list will be selected as the continuation sub-trajectory.

When making the list of candidates for concatenation, sub-trajectories are added to the list by the order they appear in the original array, i.e. the starting time. Picking up a candidate for the actual concatenation is done in First In First Out (FIFO) manner, so the first candidate that satisfies all the conditions for concatenation takes the lead priority. If, for any reason, there is a discretion to favor (a) candidate(s) over others, the list shall be reordered accordingly based on applicable criteria. An example is when priority is given to the candidates with smaller distance between their actual location and the expected location calculated based on the average speeds of the to-be-concatenated sub-trajectories.

The actual concatenation of the sub-trajectories in the concatenation buffer happens when there are at least two candidates to be concatenated. The procedure is summarized in the following:
1. Initialize the Segments map data structure
2. For all sub-trajectories in the concatenation buffer do
    a. Save the concatenation data in an output file
    b. If ground truth data is available, then remove the label information from TRAJECTORY_ID of the sub-trajectory to find the original TRAJECTORY ID_TRAJECTORY_ID update the number of stitched parts for the corresponding original TRAJECTORY_ID in the Segments map
3. If ground truth data is available, then for all TRAJECTORY_IDs in the Segments map do
    a. If total number of parts fora TRAJECTORY_ID is more than one and TRAJECTORY_ID appears in the ground truth index map, then update the corresponding reconstruction success percentage of the entry in the ground truth index map with total number of parts concatenated divided by total number of split parts The details for all rounds of concatenation are saved in an output file. In case ground truth data is available (data about original trajectories before splitting), further investigation is carried out to find out how successful the reconstructions were. This is measured by counting the number of sub-trajectories that were correctly stitched together in a round. In one example, the strict ordering and continuation of sub-trajectories may be considered by a simple modification in the calculation of reconstruction success rate. Furthermore, in case different segments of an original trajectory are reconstructed in different rounds of concatenation, different approaches are possible. In one example, the trajectory controller 121 may take into account only the longest segment from the reconstruction process and ignore the others. In another example, the trajectory controller 121 may consider all reconstructed segments. A negative score may also be considered for incorrect stitching. To keep track of the reconstructed segments, a map data structure (named Segments) is used for aggregation of statistics for each round of concatenation. This is crucial, particularly in cases where segments from different TRAJECTORY_IDs are concatenated (more than one element appears in the map). Based on the data in Segments, statistics are updated for the reconstruction success rate in the ground truth index map.

Result Interpretation

After completion of the reconstruction attack on input dataset, results are communicated to the user in different ways. In one example, the probe data is provided to the trajectory controller 121 from a manufacturer such as a vehicle manufacturer that receives the collected vehicles from a fleet of vehicles or another subset of vehicles associated with the vehicle manufacturer. In response, the trajectory controller 121 provides the results to the vehicle manufacturer upon request or automatically in response to receipt of the probe data. The vehicle manufacturer may subscribe to a service provided by the trajectory controller 121 that periodically sends the results to the vehicle manufacturer.

The result interpretation stage may include a reconstruction visualization module 53, a measuring reconstruction 54, a privacy risk quantification 55, and a split/gap recommendation module 56. The results communicated by the trajectory controller 121 to the user or the external device may include any of the following examples.

Figure 5:
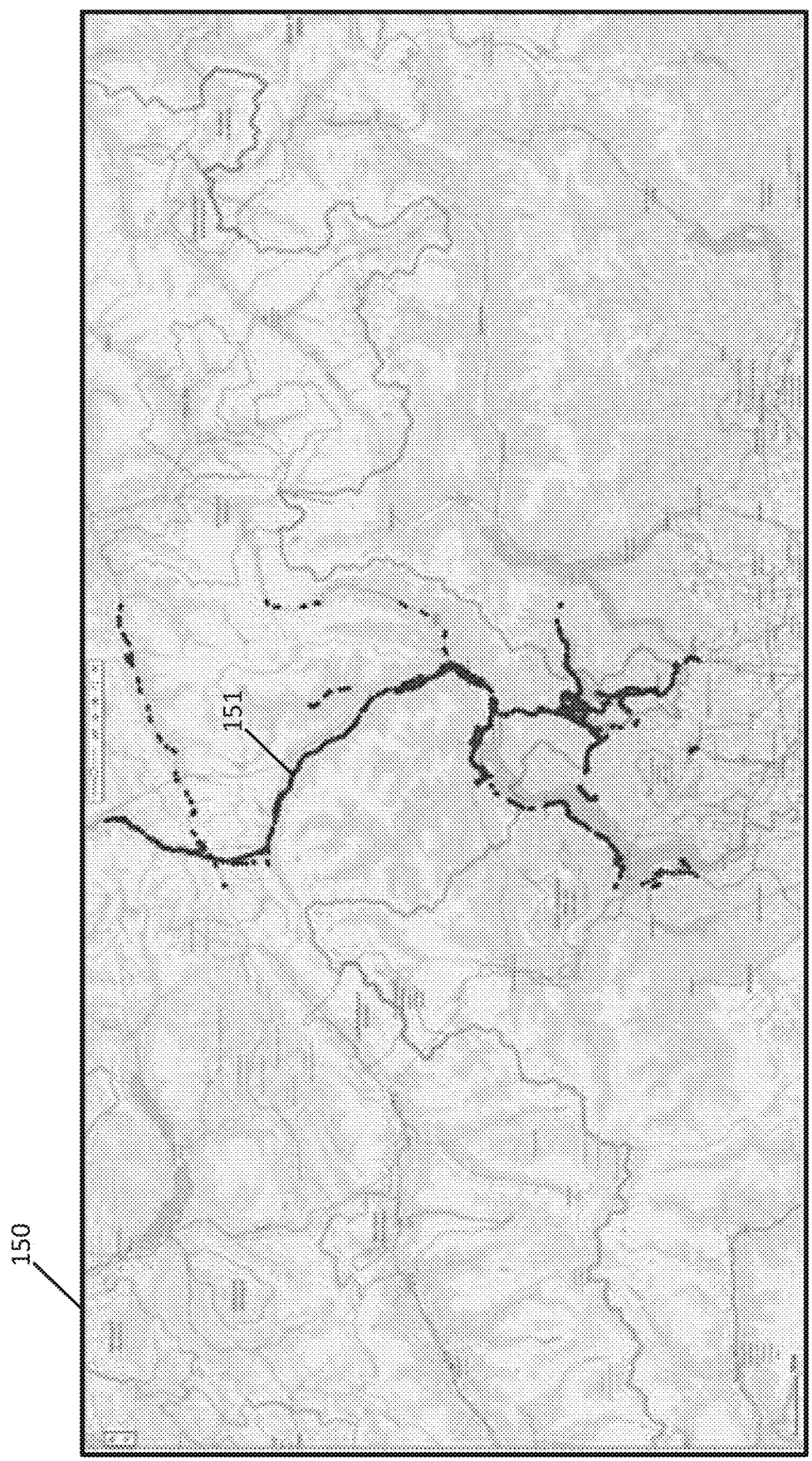
FIG. 5 illustrates reconstruction results in a graphical user interface.

The reconstruction visualization module 53 may be configured to generate one or more images or graphical indicators that conveys the results of the reconstruction. The most natural way of communication is to visualize reconstructed trajectories. This can be easily done by any tool capable of displaying trajectories via interpretation of (probe) points coordinates. The main output file containing details about concatenated sub-trajectories is used for this purpose. It may be helpful to display reconstructed trajectories superimposed with the original dataset to better illustrate the criticality of a possible attack. FIG. 5 illustrates an example graphical user interface 150 including the reconstruction results as trajectories 151 overlaid on a map of the geographic region where the probe data was collected. FIG. 5 illustrates that some trajectories are reconstructed in very long distances (e.g., multiple miles or kilometers) and other trajectories are reconstructed in short distances. The length of the distance of the reconstruction of the trajectory indicates (e.g., is proportional to) the privacy or success of the anonymization of the probe data.

The privacy risk quantification module 55 is configured to calculate statistical parameters of the reconstruction results. The calculation of statistics regarding the reconstruction success rate enables accurate quantification of the privacy risks in different scenarios and settings. The statistical parameters may include an average length of the reconstruction trajectory. The average length may be weighted based on one or more parameters such as geographic area, number of probe points, or other factors. When statistics are calculated for individual reconstruction cases, a standard and a weighted mean are also calculated for the reconstruction success rate considering the whole dataset. These values reflect overall percentages for the successful reconstruction of original trajectories. The weighted mean is different from the standard mean in a sense that it accounts in favor of reconstruction percentages of longer trajectories over shorter ones. Thus, a 50 percent reconstruction success for a trajectory that has been initially split into 4 parts (2 sub-trajectories were correctly concatenated out of 4) has less value than a trajectory that initially was split into 20 parts.

Figure 6:
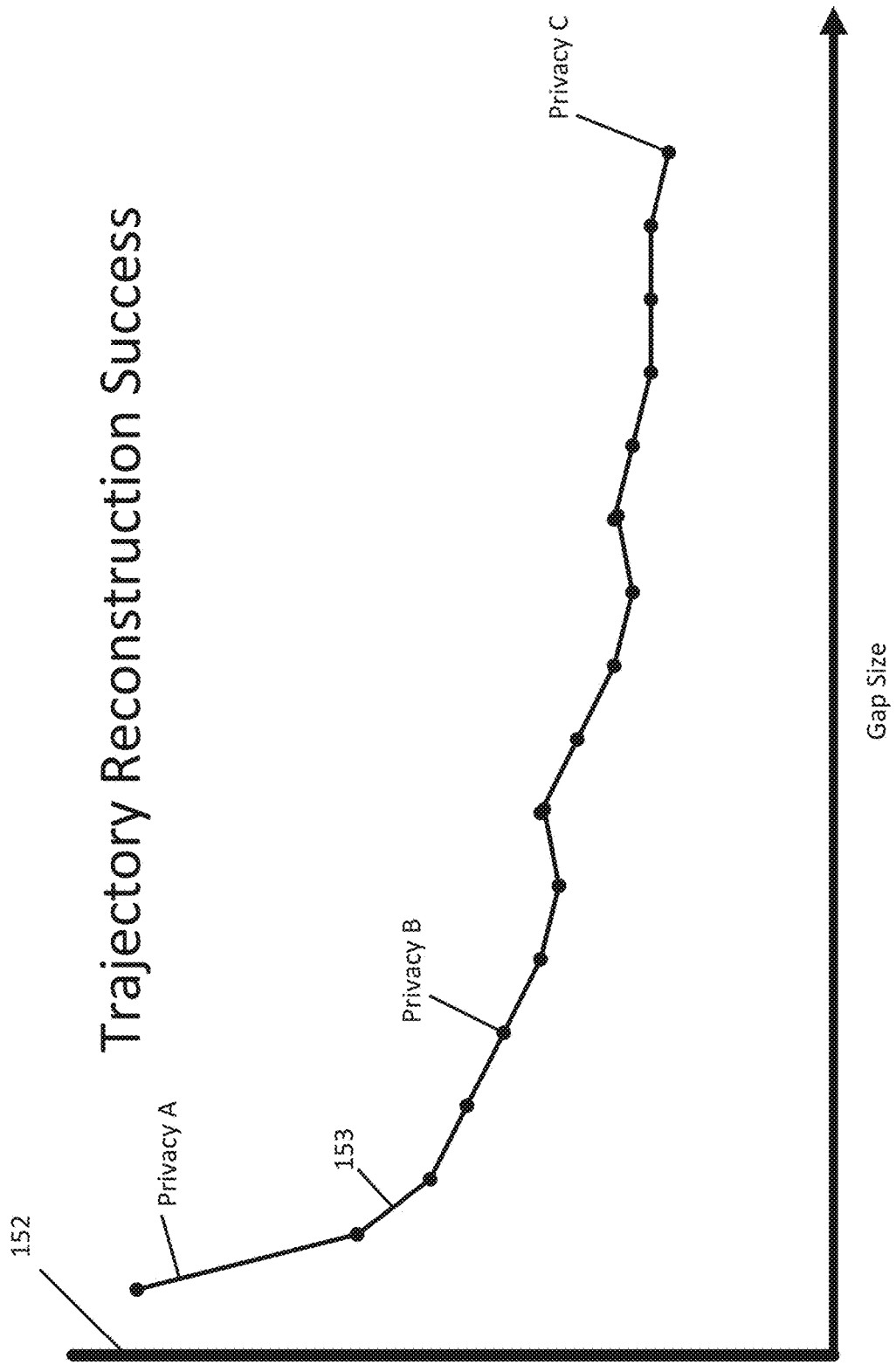
FIG. 6 illustrates reconstruction results with a varying anonymization parameter.

The split/gap recommendation module 56 is configured to calculate a relationship between a gap size in the probe points and the privacy achieved through anonymization of the probe points. FIG. 6 illustrates an example plot 152 that illustrates the relationship between gap size and privacy. There is a trade-off between utility and privacy of data. As gap size is kept smaller, the probe data is more useful (i.e., positions are provided more accurately to applications). However, datasets with small gap sizes are more easily reconstructed, which means privacy is lower.

The trajectory controller 121 (e.g., split/gap recommendation module 56) is configured to calculate or simulate multiple different gap sizes on the same set of probe data to accurately estimate or calculate the privacy levels that are achieved with different gap sizes. A user (e.g., vehicle manufacturer) may choose to use one gap size and expected privacy combination for one application and another gap size and expected privacy combination for another application. The chart 152 in FIG. 6 illustrates three different privacy levels (privacy level A, B, and C) that are achieved on the same data set depending on the gap size. Privacy A, the lowest privacy level, corresponds to the smallest gap size. Privacy B, the next lowest privacy level, corresponds to the next smallest gap size. Privacy C, the highest privacy level, corresponds to the largest gap size. These points are selected arbitrarily. The line 153 for the privacy to gap size relationship may be continuous or a continuous line may be fitted to the discrete points.

The trajectory controller 121 (e.g., split/gap recommendation module 56) is configured to calculate an optimal point along the line 153 for the privacy to gap size relationship. In one example, the trajectory controller 121 may calculate a number of gap size settings spaced at predetermined intervals. The trajectory controller 121 may calculate a slope or derivative of the line 153 for the privacy to gap size relationship between successive pairs of points. The trajectory controller 121 may compare the slopes or derivative values and select the gap size that is smaller than the greatest slope. In this way, the trajectory controller 121 selects the gap size where the gain, most, in the way of privacy, is gained by giving up the least utility associated with the larger gap size.

Figure 7:
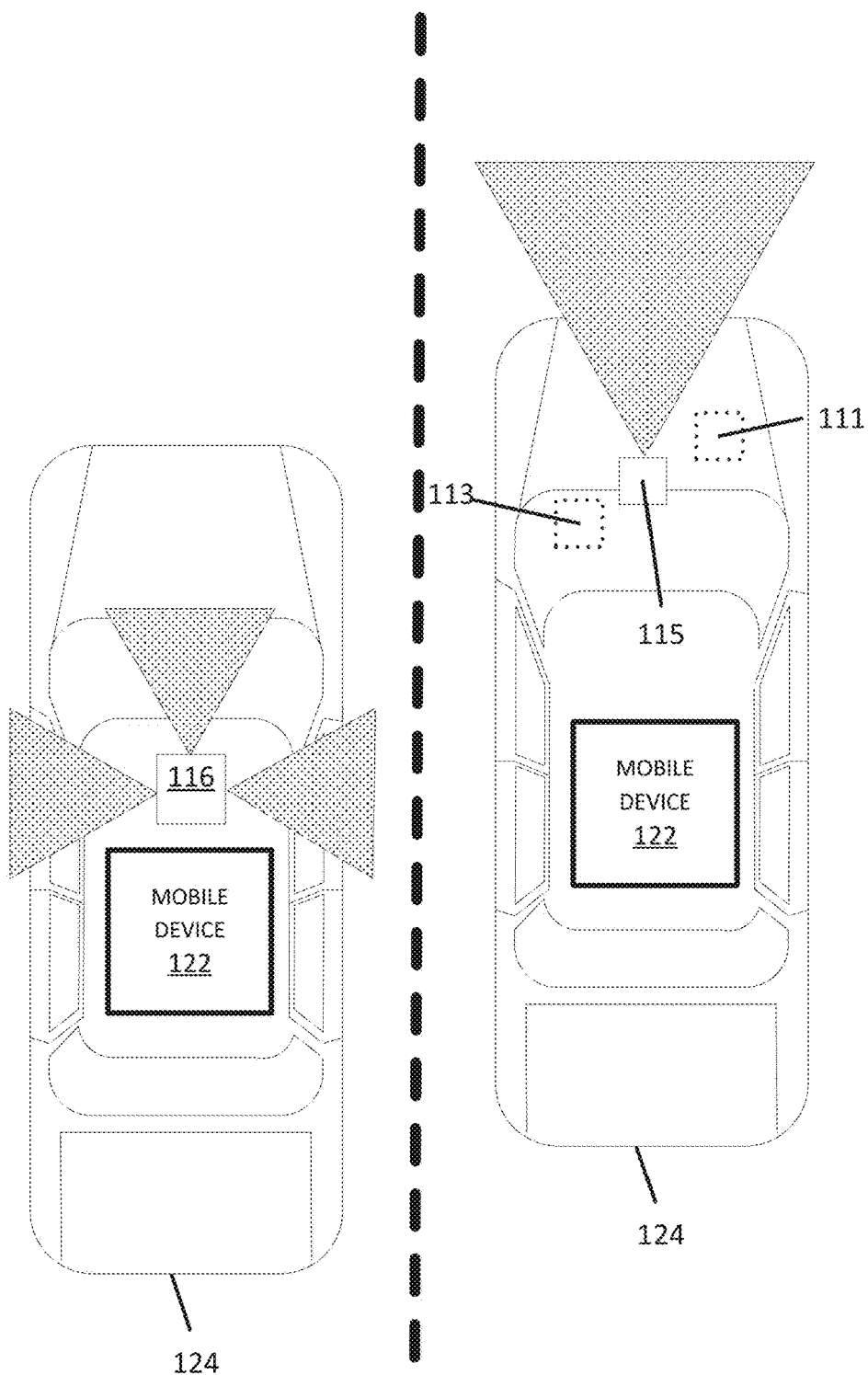
FIG. 7 illustrates exemplary vehicles of the system of FIG. 1.

FIG. 7 illustrates an exemplary vehicle 124 of the system of FIG. 1. The vehicles 124 may include a variety of devices that generate trajectory data. The trajectory data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a light detection and ranging (LiDAR) device. The distance data detection sensor may generate point cloud data. The distance data detection sensor may include a laser range finder that rotates a mirror directing a laser to the surroundings or vicinity of the collection vehicle on a roadway or another collection device on any type of pathway. The distance data detection device may generate the trajectory data. Other types of pathways may be substituted for the roadway in any embodiment described herein.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a mobile device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 116, an image capture system 115 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera or another camera.

In some alternatives, additional sensors may be included in the vehicle 124. An engine sensor 111 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor.

A mobile device 122 may be integrated in the vehicle 124, which may include assisted driving vehicles such as autonomous vehicles, highly assisted driving (HAD), and advanced driving assistance systems (ADAS). Any of these assisted driving systems may be incorporated into mobile device 122. Alternatively, an assisted driving device may be included in the vehicle 124. The assisted driving device may include memory, a processor, and systems to communicate with the mobile device 122. The assisted driving vehicles may respond to the anonymized data or other geographic data received from geographic database 123 and the server 125 and driving commands or navigation commands.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to the anonymized data or other geographic data received from geographic database 123 and the server 125 and driving commands or navigation commands.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode.

Other levels of automation are possible. The HAD vehicle may control the vehicle through steering or braking in response to the on the position of the vehicle and may respond to the anonymized data or other geographic data received from geographic database 123 and the server 125 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle or based on the anonymized data or other geographic data received from geographic database 123 and the server 125 and driving commands or navigation commands.

Figure 8:
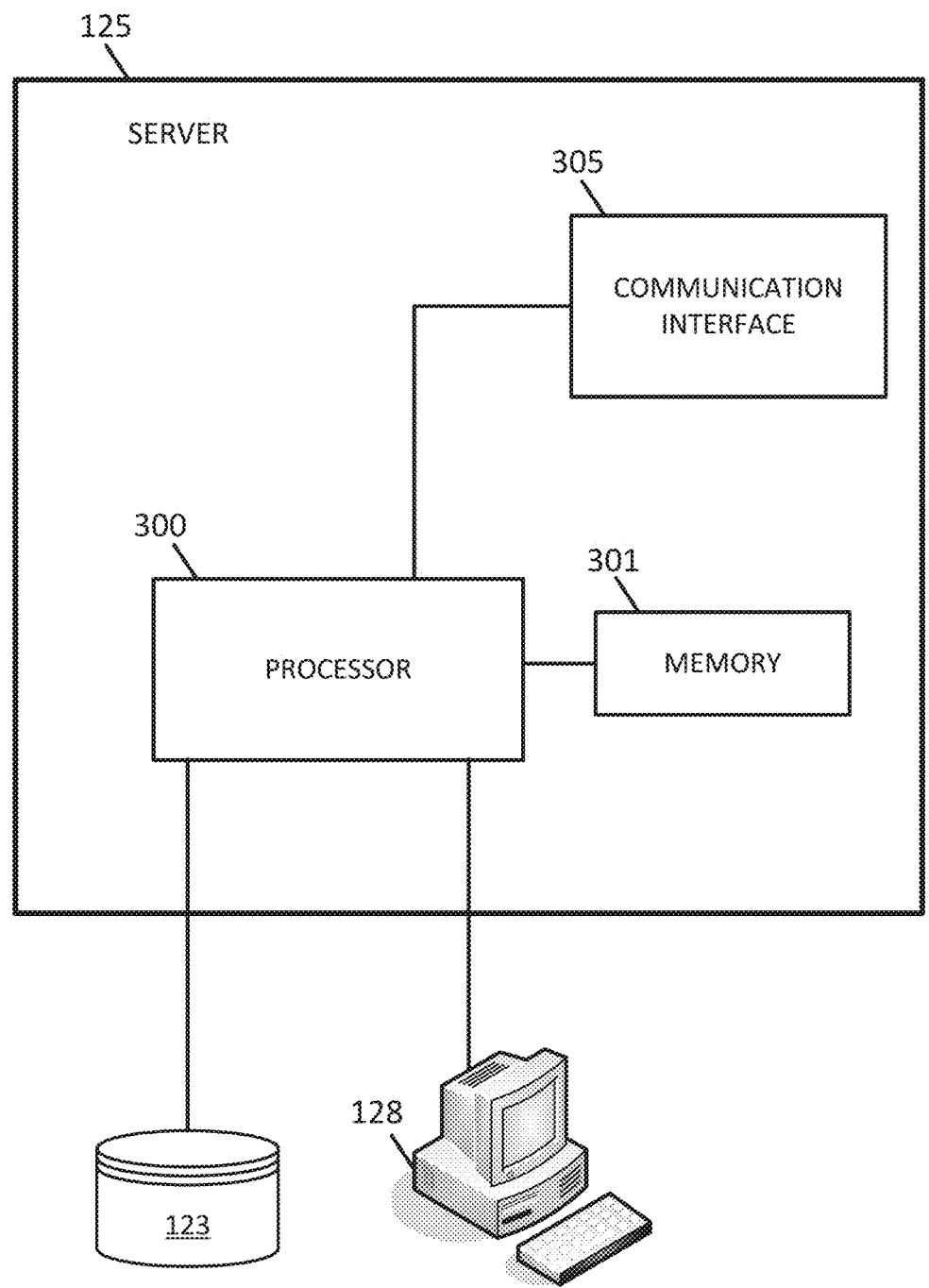
FIG. 8 illustrates an example server.

FIG. 8 illustrates an example server 125, which may apply to the system of FIG. 1. The server 125 includes a processor 300, a communication interface 305, a memory 301, and a database 123. The processor 300 may implement the functions associated with the trajectory controller 121. The memory 301 may store the anonymized data including probe points for the trajectories and sub-trajectories. The communication interface 305 may facilitate the receipt of the probe data from the probes 101a-n as well as provide the anonymity data to an external device such as the manufacturer device 215. An input device (e.g., keyboard or personal computer 128) may be used to enter settings to the server 125. The settings may include settings for thresholds and other user preferences described herein. The settings may include gap length, sampling frequency, sub-trajectory probe quantity, sub-trajectory geographic length or other parameters. Additional, different, or fewer components may be provided in the server 125.

Figure 9:
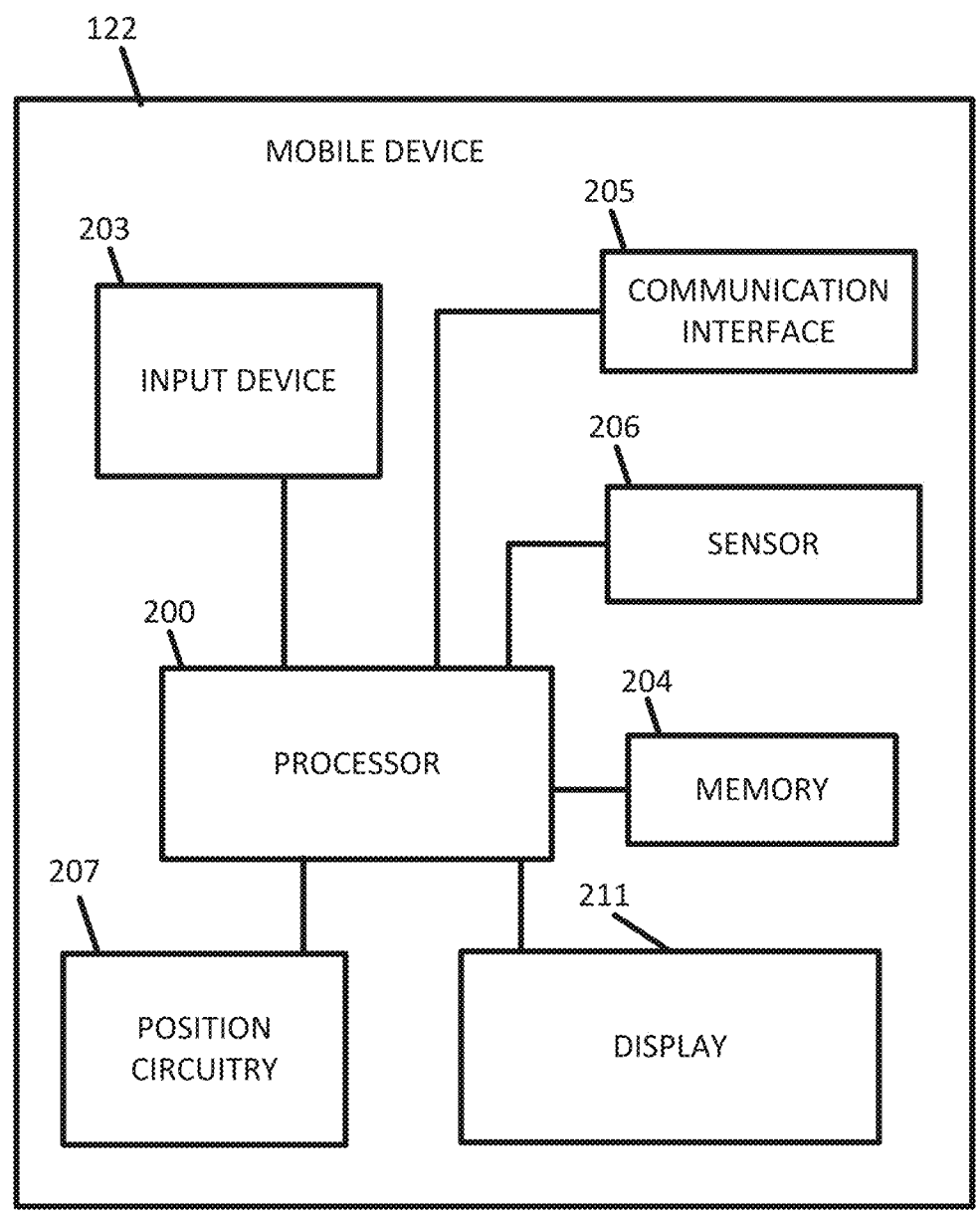
FIG. 9 illustrates an example mobile device.

FIG. 9 illustrates an exemplary mobile device 122 of the system of FIG. 1. The mobile device 122 includes a processor 200, a memory 204, an input device 203, a communication interface 205, position circuitry 207, a display, and a sensor 206. The input device 203 may receive commands from the user for default settings for the trajectory reconstruction techniques. The default settings may include the default gap length, sampling frequency, sub-trajectory probe quantity, sub-trajectory geographic length or other parameters.

The processor 200 may communicate with a vehicle ECU which operates one or more driving mechanisms (e.g., accelerator, brakes, steering device). Alternatively, the mobile device 122 may be the vehicle ECU, which operates the one or more driving mechanisms directly. The sensor 206 may include a camera, a LiDAR device, or another sensor described herein. The sensor 206 may detect congestion local to the mobile device 122. The sensor 206 may detect when an intersection is approaching. Additional, different, or fewer components are possible for the mobile device 122.

Figure 10:
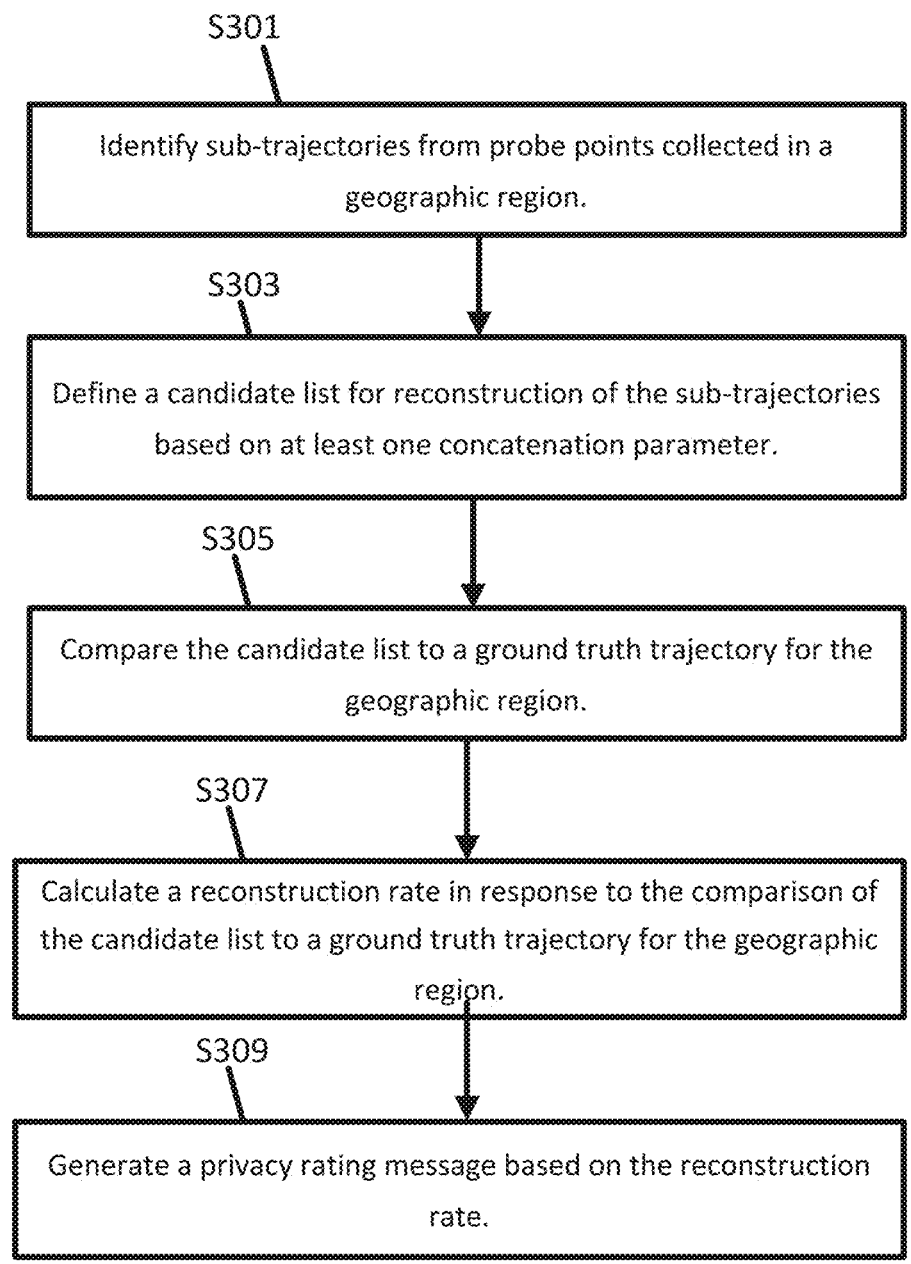
FIG. 10 illustrates an example flow chart for the operations of the server and/or the mobile device.

FIG. 10 illustrates an example flowchart for the operation of mobile device 122 or the server 125. Additional, different, or fewer acts may be provided.

In one example, the mobile device 122 collects the trajectory data using the position circuitry 207. The position circuitry 207 or the processor 200 detects a geographic position of the mobile device 122 or the vehicle 124. The position circuitry 207 is one example means for detecting or determining a geographic position. The processor 200 may also include circuitry serving as means for detecting or determining a geographic position. The detected geographic position of the mobile device 122 may include a latitude and longitude pair. The geographic position may be detected or sampled at periodic intervals in time or distance or may be continuously detected. The sensor 206, which may include distancing sensors, range sensor, image sensors, or another sensor as described with respect to FIG. 10 may also provide information for determining the geographic position of the mobile device 122.

Either the mobile device 122 or the server 125 performs the acts of FIG. 10. The resulting anonymized data may be provided back to the mobile device 122 or other mobile devices 122 for the LBS.

At act S301, the processor 200 or the processor 300 identifies sub-trajectories from probe points collected in a geographic region. The sub-trajectories may be identified according to source. Data collected at the mobile device 122 may be appended with an identifying field or signature for the mobile device 122 and/or a timestamp. The data is grouped as a sub-trajectory according to the identifying field and/or timestamp. Multiple sub-trajectories may make up the original path of the mobile device 122, which was split and/or padded with gaps to anonymize the data. The gaps may be inserted by deleting points at a predetermined or random interval.

The processor 200 may include an identification module including an application specific module or processor that identifies sub-trajectories from probe points collected in a geographic region. The identification module is an example means for identifying sub-trajectories from probe points collected in a geographic region.

At act S303, the processor 200 or the processor 300 defines a candidate list for reconstruction of the sub-trajectories based on at least one concatenation parameter. The candidate list may include all available sub-trajectories in a geographic region. The candidate list may include sub-trajectories that are within a predetermined distance from one another, collected within a predetermined time from one another, include a sampling rate indicative of the same or similar source, or are separate by similar gap lengths. The candidate list may be modified through one or more iterations or comparisons of these parameters to pairs of candidates. For example, in a candidate list having four sub-trajectories A, B, C and D, the pairs of candidates for comparison may include AB, BC, BD, AC, AD, CD, but may be adjusted according to prior matches.

The processor 200 may include a candidate list module including an application specific module or processor that calculates a candidate list for reconstruction of original trajectories from sub-trajectories based on at least one concatenation parameter. The candidate list module is an example means for defining a candidate list for reconstruction of original trajectories from sub-trajectories based on at least one concatenation parameter.

At act S305, the processor 200 or the processor 300 performs a comparison of the candidate list to a ground truth trajectory for the geographic region. The final candidate list, or estimate thereof from the end of act S303, is a reconstructed trajectory of the identified sub-trajectories. To evaluate how well the reconstruction was performed, or whether there was a privacy risk due to the ineffectiveness of anonymization as indicated by the reconstruction, the final candidate list is compared to the original trajectory before anonymization. The original trajectory before anonymization is referred to as the ground truth trajectory.

The processor 200 may include a comparison module including an application specific module or processor that performs a comparison of the reconstructed trajectory to a ground truth trajectory for the geographic region. The comparison module is an example means for performing a comparison of the reconstructed trajectory to a ground truth trajectory for the geographic region;

At act S307, the processor 200 or the processor 300 calculates a reconstruction rate in response to the comparison of the reconstructed trajectory to a ground truth trajectory for the geographic region. The reconstruction rate may be a percentage of the number of sub-trajectories that are correctly matched according to the ground truth trajectory. The reconstruction rate may be the proportion of sub-trajectories that are correctly matched in the geographic region.

The processor 200 may include a reconstruction rate module including an application specific module or processor that calculates a reconstruction rate in response to the comparison of the reconstructed trajectory to a ground truth trajectory for the geographic region. The reconstruction rate module is an example means for calculating a reconstruction rate.

At act S309, the processor 200 or the processor 300 generates a privacy rating message based on the reconstruction rate. The privacy rating message may include a quantification of the risk to privacy associated with the reconstruction rate. The quantification of risk may be a numerical value, or a category of risk such as low, medium, or high. The privacy rating message may include data for displaying an image or other indicator for the reconstruction rate or the quantification of risk. The privacy rating message may include a privacy recommendation based on the reconstruction rate or the quantification of risk. The privacy rating message may include an anonymization parameter selected in response to the reconstruction rate. The anonymization parameter may be a gap length recommendation to return the risk to privacy to an acceptable level.

The processor 200 may include a private notification module including an application specific module or processor that generates a privacy rating message in response to the reconstruction rate and/or including the reconstruction rate. The privacy notification module is an example means for generating a private rating message.

The processor 200 or 300 may include a routing module including an application specific module or processor that calculates routing between an origin and destination. The routing module is an example means for generating a route in response to the anonymized data to the destination. The routing command may be a driving instruction (e.g., turn left, go straight), which may be presented to a driver or passenger, or sent to an assisted driving system. The display 211 is an example means for displaying the routing command. The mobile device 122 may generate a routing instruction based on the anonymized data.

The routing instructions may be provided by display 211. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The mobile device 122, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device 122 may plan a route through a road system or modify a current route through a road system in response to the request for additional observations of the road object. For example, when the mobile device 122 determines that there are two or more alternatives for the optimum route and one of the routes passes the initial observation point, the mobile device 122 selects the alternative that passes the initial observation point. The mobile devices 122 may compare the optimal route to the closest route that passes the initial observation point. In response, the mobile device 122 may modify the optimal route to pass the initial observation point.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles 124 or mobile device 122 flor through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

Figure 11:
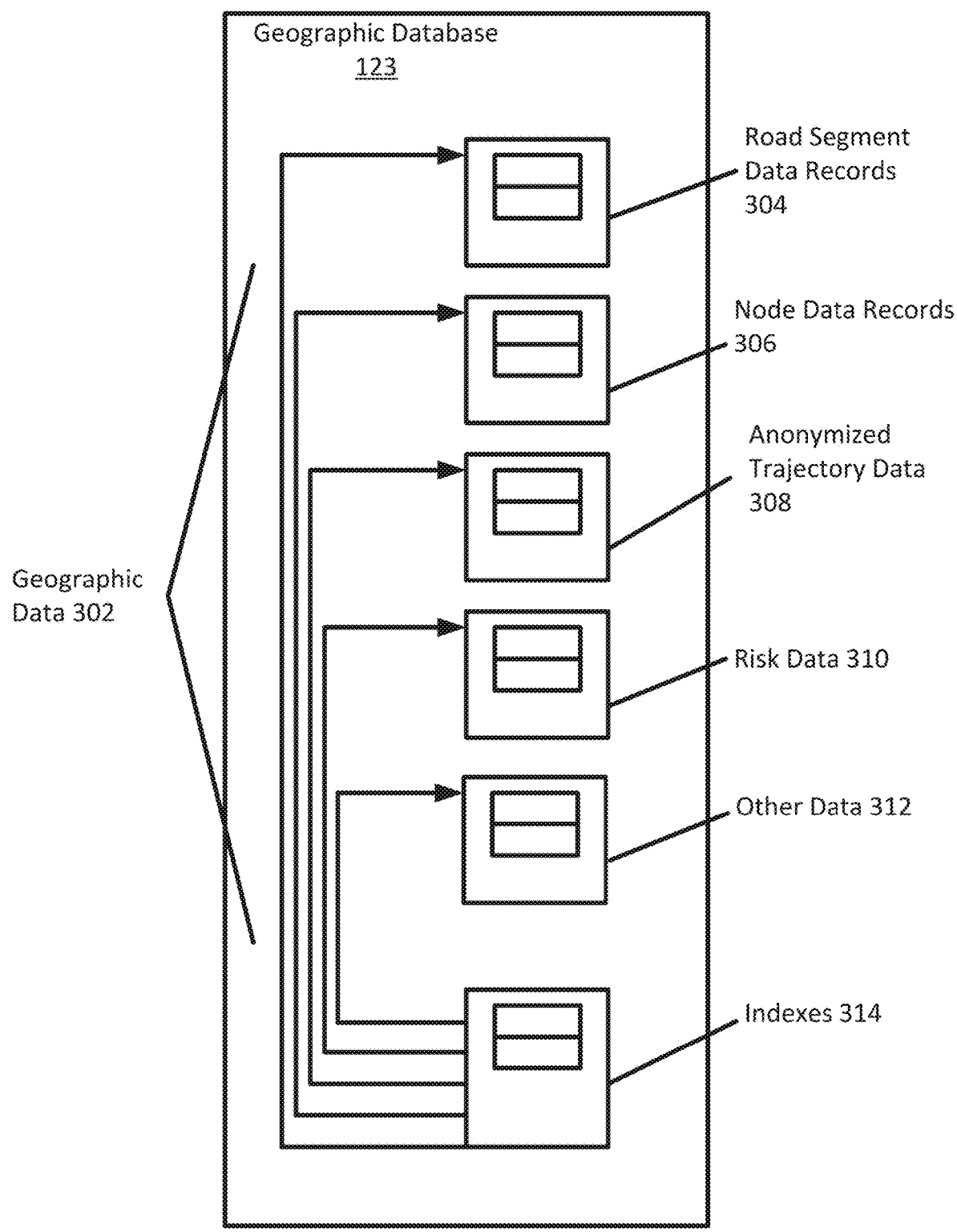
FIGS. 11 and 12 illustrate example geographic databases.

In FIG. 11, the geographic database 123 may contain at least one road segment database record 304 (also referred to as "entity" or "entry") for each road segment in a particular geographic region. The geographic database 123 may also include a node database record 306 (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The geographic database 123 may include risk data 310 including a quantification of the privacy risk as determined from the reconstructing techniques described herein. The risk data 310 may include a rating for the risk. The risk data 310 may include a success rate for the reconstruction. The risk data 310 may include a list of applications that the geographic database 123 is suitable for given the risk. The risk data 310 may include a list of recipients or a security level for potential recipients suitable to receive data from the geographic database 123.

The geographic database 123 may include other kinds of data 312. The other kinds of data 312 may represent other kinds of geographic features or anything else. The other kinds of data may include POI data. For example, the POI data may include POI records comprising a type (e.g., the type of POI, such as restaurant, hotel, city hall, police station, historical marker, ATM, golf course, etc.), location of the POI, a phone number, hours of operation, etc.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304.

As another example, the indexes 314 may relate anonymized trajectory data 308 with a road segment in the segment data records 304 or a geographic coordinate. An index 314 may, for example, store anonymized trajectory data 308 relating to one or more trajectories that have been anonymized using the embodiments described herein. The database 123 may also include the centroid table 33 and/or the edge table 34.

The geographic database 123 may also include other attributes of or about roads such as, for example, geographic coordinates, physical geographic features (e.g., lakes, rivers, railroads, municipalities, etc.) street names, address ranges, speed limits, turn restrictions at intersections, and/or other navigation related attributes (e.g., one or more of the road segments is part of a highway or toll way, the location of stop signs and/or stoplights along the road segments), as well as POIs, such as gasoline stations, hotels, restaurants, museums, stadiums, offices, automobile dealerships, auto repair shops, buildings, stores, parks, municipal facilities, other businesses, etc. The geographic database 123 may also contain one or more node data record(s) 306 which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data 302 may additionally or alternatively include other data records such as, for example, POI data records, topographical data records, cartographic data records, routing data, and maneuver data. Other contents of the database 123 may include temperature, altitude or elevation, lighting, sound or noise level, humidity, atmospheric pressure, wind speed, the presence of magnetic fields, electromagnetic interference, or radio- and micro-waves, cell tower and wi-fi information, such as available cell tower and wi-fi access points, and attributes pertaining to specific approaches to a specific location.

The geographic database 123 may include historical traffic speed data for one or more road segments. The geographic database 123 may also include traffic attributes for one or more road segments. A traffic attribute may indicate that a road segment has a high probability of traffic congestion.

Figure 12:
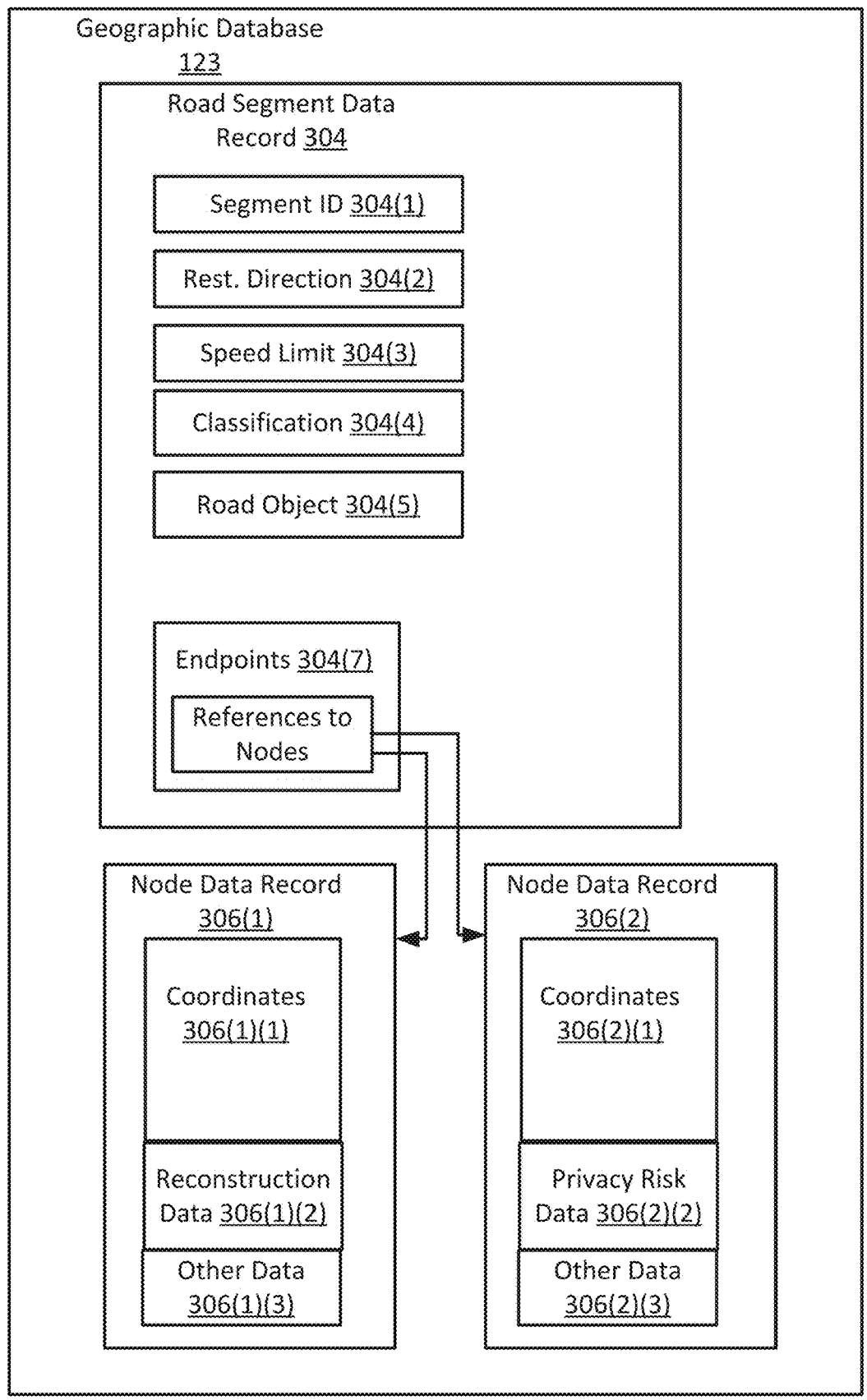

FIG. 12 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include location fingerprint data, for example a set of sensor data for a particular location.

The geographic database 123 may include road segment data records 304 (or data entities) that describe features such as road objects 304(5). The road objects 304(5) may be stored according to location boundaries or vertices. The road objects 304(5) may be stored as a field or record using a scale of values such as from 1 to 100 for type or size. The road objects may be stored using categories such as low, medium, or high. Additional schema may be used to describe the road objects. The attribute data may be stored in relation to a link/segment 304, a node 306, a strand of links, a location fingerprint, an area, or a region. The geographic database 123 may store information or settings for display preferences. The geographic database 123 may be coupled to a display. The display may be configured to display the roadway network and data entities using different colors or schemes.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-reference each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 12 also shows some of the components of a node data record 306 that may be contained in the geographic database 123. Each of the node data records 306 may have associated information (such as "attributes", "fields", etc.) that allows identification of the road segment(s) that connect to it and/or its geographic position (e.g., its latitude and longitude coordinates). The node data records 306(1) and 306(2) include the latitude and longitude coordinates 306(1)(1) and 306(2)(1) for their node, and reconstruction data 306 (1)(2), which may include the boundaries for the trajectory reconstructing techniques described herein. That is, nodes defined by node data records 306(1) may form a geographic region in which the trajectory data is reconstructed according to embodiment herein. In addition, node data records 306(2) may include privacy quantification data 306(2)(2), which indicates the privacy risk in the geographic database for the area of the node as determined by the reconstructing techniques described herein. The reconstruction data 306 (1)(2) and the privacy quantification data 306(2)(2) may change dynamically or over time. The node data records 306(1) and 306(2) may also include other data 306(1)(3) and 306(2)(3) that refer to various other attributes of the nodes.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout a geographic region to observe features and/or record information about the roadway. Remote sensing, such as aerial or satellite photography, may be used. The database 123 may be incorporated in or connected to the server 125.

The geographic database 123 and the data stored within the geographic database 123 may be licensed or delivered on-demand. Other navigational services or traffic server providers may access the location fingerprint data, traffic data and/or the lane line object data stored in the geographic database 123.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The databases 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The databases may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The databases may include historical traffic speed data for one or more road segments. The databases may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface of the display 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network devices.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for quantification of privacy risk in geographic data for probe devices in a geographic region, the method comprising:
receiving trajectory data in a plurality of probe points based on sequences of sensor measurements of the probe devices collected in the geographic region;
identifying at least a trajectory identifier from each of the plurality of probe points;
determining sub-trajectories from changes in the trajectory identifiers in the plurality of probe points;
defining a candidate list for reconstruction of original trajectories from the sub-trajectories into a reconstructed trajectory and based on at least one concatenation parameter;
calculating a reconstruction rate in the trajectory data;
calculating a gap recommendation based on statistics for the reconstructed trajectory and the reconstruction rate; and
providing a quantification of privacy risk based on the gap recommendation to an external device.

2. The method of claim 1, further comprising:
performing a comparison of a first sub-trajectory and a second sub-trajectory based on the at least one concatenation parameter.

3. The method of claim 2, wherein the concatenation parameter includes a maximum estimated distance for traveling from the first sub-trajectory to the second sub-trajectory.

4. The method of claim 2, wherein the concatenation parameter includes a time difference for a gap length between the first sub-trajectory and the second sub-trajectory.

5. The method of claim 2, wherein the concatenation parameter includes a product of (1) a time difference to sampling frequency match and (2) a modal value for a sampling frequency of the first sub-trajectory.

6. The method of claim 2, wherein the concatenation parameter includes a lower bound of sampling frequency ratio for a sampling frequency of the first sub-trajectory and a sampling frequency of the second sub-trajectory.

7. The method of claim 1, further comprising:
determining whether a ground truth data set is available for sub-trajectories extracted from the original trajectories; and
when the ground truth data set is available, comparing the reconstructed trajectory to the ground truth data set, wherein the reconstruction rate is based on the ground truth data set.

8. The method of claim 1, further comprising:
generating an output of concatenated sub-trajectories for the candidate list, wherein the output is an image or an output file included in the quantification of privacy risk.

9. The method of claim 1, further comprising:
sub-sampling the plurality of probe points according to a preset sampling frequency.

10. The method of claim 1, further comprising:
filtering the plurality of probe points according to a preset filtering parameter.

11. An apparatus for quantification of privacy risk in geographic data for probe devices in a geographic region, the apparatus comprising:
a database configured to store trajectory data based on sequences of sensor measurements of a plurality of probe devices;
a controller configured to receive trajectory data in a plurality of probe points based on sequences of sensor measurements of the probe devices collected in the geographic region and determine sub-trajectories from changes in trajectory identifiers in the plurality of probe points;
the controller configured to concatenate at least two of the sub-trajectories based on at least one concatenation parameter; and
the controller configured to calculate a reconstruction rate in the trajectory data and provide the reconstruction rate or a quantification of privacy risk based on the reconstruction rate to an external device,
wherein the controller is configured to calculate a gap recommendation based on statistics for the reconstructed trajectory and the reconstruction rate, wherein the gap recommendation is included in the quantification of privacy risk.

12. The apparatus of claim 11, wherein the controller is configured to compare a first sub-trajectory and a second sub-trajectory based on the at least one concatenation parameter.

13. The apparatus of claim 12, wherein the concatenation parameter includes a maximum estimated distance for a traveling distance from the first sub-trajectory and the second sub-trajectory, a time difference for a gap length between the first sub-trajectory and the second sub-trajectory, a product of a time difference to sampling frequency match and a modal value for a sampling frequency of the first sub-trajectory, or a lower bound of sampling frequency ratio for a sampling frequency of the first sub-trajectory and a sampling frequency of the second sub-trajectory.

14. The apparatus of claim 11, further comprising:
wherein the controller is configured to determine whether a ground truth data set is available for reconstruction of original trajectories and, when the ground truth data set is available, configured to compare the reconstructed trajectory to the ground truth data set, wherein the reconstruction rate is based on the ground truth data set.

15. The apparatus of claim 11, further comprising:
wherein the controller is configured to generate an output of concatenated sub-trajectories for a candidate list, wherein the output is an image or an output file included in the quantification of privacy risk.

16. A non-transitory computer readable medium including instructions that when executed by a process are configured to perform:
identifying a plurality of sub-trajectories from a plurality of probe points collected in a geographic region;

defining a candidate list for reconstruction of original trajectories into reconstructed trajectories based on at least one concatenation parameter;
performing a comparison of the reconstructed trajectories to a ground truth trajectory for the geographic region;
calculating a reconstruction rate in response to the comparison of the candidate list to a ground truth trajectory for the geographic region;
calculating a gap recommendation based on statistics for the reconstructed trajectory and the reconstruction rate; and
generating a privacy rating message based on the gap recommendation.

17. The non-transitory computer readable medium of claim 16, the instructions further configured to perform:
generating a privacy recommendation based on the reconstruction rate or the privacy rating message.

18. The non-transitory computer readable medium of claim 17, the instructions further configured to perform:
selecting an anonymization parameter in response to the reconstruction rate or the privacy rating message.

* * * * *